(12) United States Patent
Shigeta

(10) Patent No.: US 11,094,167 B2
(45) Date of Patent: Aug. 17, 2021

(54) INSPECTION SYSTEM AND INSPECTION DEVICE

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

( * ) Notice: Subject to any disclaimer, the term of this patent is extended or adjusted under 35 U.S.C. 154(b) by 0 days.

(21) Appl. No.: 16/461,914

(22) PCT Filed: Nov. 14, 2017

(86) PCT No.: PCT/JP2017/040920
§ 371 (c)(1),
(2) Date: May 17, 2019

(87) PCT Pub. No.: WO2018/092768
PCT Pub. Date: May 24, 2018

(65) Prior Publication Data
US 2019/0333323 A1 Oct. 31, 2019

(30) Foreign Application Priority Data
Nov. 18, 2016 (JP) .............................. JP2016-225540

(51) Int. Cl.
*G07F 17/32* (2006.01)
*G06T 7/90* (2017.01)
(Continued)

(52) U.S. Cl.
CPC ............ *G07F 17/3241* (2013.01); *G01J 3/50* (2013.01); *G06K 19/07758* (2013.01);
(Continued)

(58) Field of Classification Search
None
See application file for complete search history.

(56) References Cited

U.S. PATENT DOCUMENTS

| 5,166,502 A | 11/1992 | Rendleman et al. |
| 5,735,742 A | 4/1998 | French |

(Continued)

FOREIGN PATENT DOCUMENTS

| CN | 1383104 A | 12/2002 |
| CN | 102173770 A | 7/2011 |

(Continued)

OTHER PUBLICATIONS

International Search Report dated Feb. 20, 2018 issued in corresponding PCT Application PCT/JP2017/040920 cites the patent documents above.

(Continued)

*Primary Examiner* — Reza Aghevli
(74) *Attorney, Agent, or Firm* — Norton Rose Fulbright US LLP

(57) ABSTRACT

Provided is an inspection system capable of inspecting a plurality of gaming coins housed in a case in the state housed in the case. The inspection system (1) inspects the game chips (C) which incorporates the wireless tag storing the first game chip information and to which the optically readable second game chip information is added on the side. The inspection system (1) comprises a case (100) for stacking and storing a plurality of game chips (C) and an inspection device (200) for inspecting gaming coins (C) housed in the case (100). The inspection device (200) comprises an RFID reader (221) for reading the RFID tag (503) of the gaming chips (C) housed in the case (100) and acquiring the first gaming chip information; an infrared camera (225) and a visible light camera (226) for optically reading the side surface of the gaming chips (C) housed in the case (100) to obtain second gaming chip information; a determination unit (231) that determines whether the gaming chips (C) passes or not for each case (100) based on the acquired first gaming (Continued)

chip information and the acquired second gaming chip information.

22 Claims, 28 Drawing Sheets

(51) Int. Cl.

| | | |
|---|---|---|
| *G01J 3/50* | (2006.01) | |
| *G06T 7/00* | (2017.01) | |
| *G07D 5/08* | (2006.01) | |
| *G06K 19/077* | (2006.01) | |

(52) U.S. Cl.
CPC ............ *G06T 7/001* (2013.01); *G06T 7/0002* (2013.01); *G06T 7/90* (2017.01); *G07D 5/08* (2013.01); *G07F 17/322* (2013.01); *G07F 17/3204* (2013.01); *G07F 17/3223* (2013.01); *G07F 17/3251* (2013.01); *G06T 2207/10024* (2013.01); *G06T 2207/10048* (2013.01); *G06T 2207/30221* (2013.01); *G07D 2205/00* (2013.01)

(56) References Cited

U.S. PATENT DOCUMENTS

| | | | |
|---|---|---|---|
| 8,668,148 B2 | 3/2014 | Gronau et al. | |
| 10,192,085 B2* | 1/2019 | Shigeta | G07D 5/00 |
| 10,403,090 B2* | 9/2019 | Shigeta | G01J 3/50 |
| 2003/0220136 A1 | 11/2003 | Soltys et al. | |
| 2007/0026949 A1 | 2/2007 | Charlier et al. | |
| 2007/0035399 A1* | 2/2007 | Hecht | G07F 17/322 |
| | | | 340/572.1 |
| 2007/0184898 A1* | 8/2007 | Miller | G07F 17/32 |
| | | | 463/29 |
| 2007/0293303 A1* | 12/2007 | Shayesteh | G07F 17/3251 |
| | | | 463/25 |
| 2008/0188292 A1* | 8/2008 | Walker | G07F 17/3244 |
| | | | 463/25 |
| 2009/0069090 A1* | 3/2009 | Moser | G07F 17/3239 |
| | | | 463/42 |
| 2009/0075725 A1* | 3/2009 | Koyama | G07F 17/32 |
| | | | 463/25 |
| 2009/0124379 A1* | 5/2009 | Wells | G07F 17/3211 |
| | | | 463/31 |
| 2009/0131151 A1* | 5/2009 | Harris | G07F 17/32 |
| | | | 463/22 |
| 2009/0191933 A1* | 7/2009 | French | A63F 1/10 |
| | | | 463/12 |
| 2009/0291751 A1* | 11/2009 | Koyama | G07F 17/3232 |
| | | | 463/25 |
| 2010/0004051 A1* | 1/2010 | Walker | G07F 17/3211 |
| | | | 463/22 |
| 2010/0105485 A1* | 4/2010 | Kuhn | G07F 17/322 |
| | | | 463/47 |
| 2010/0113159 A1 | 5/2010 | Chapman et al. | |
| 2011/0124405 A1 | 5/2011 | Okada | |
| 2011/0275432 A1 | 11/2011 | Lutnick et al. | |
| 2013/0178281 A1 | 7/2013 | Ayyar et al. | |
| 2013/0316797 A1 | 11/2013 | Gelinotte et al. | |
| 2014/0038721 A1 | 2/2014 | Archer et al. | |
| 2014/0370980 A1* | 12/2014 | Czyzewski | G07F 17/322 |
| | | | 463/31 |
| 2015/0087371 A1* | 3/2015 | Hill | G07F 17/3244 |
| | | | 463/11 |
| 2015/0111643 A1 | 4/2015 | Olofsson et al. | |
| 2016/0180633 A1* | 6/2016 | Yamaguchi | G07F 17/323 |
| | | | 463/31 |
| 2016/0351017 A1* | 12/2016 | Moore | G07F 17/3276 |
| 2017/0140612 A1* | 5/2017 | Moore | G07F 17/3204 |
| 2017/0278341 A1* | 9/2017 | Moore | G07F 17/3211 |
| 2018/0075698 A1* | 3/2018 | Shigeta | G07F 17/3209 |
| 2018/0144579 A1 | 5/2018 | Shigeta | |
| 2018/0350191 A1 | 12/2018 | Shigeta | |
| 2019/0102987 A1* | 4/2019 | Shigeta | G06K 19/07758 |
| 2019/0108376 A1* | 4/2019 | Shigeta | G07F 17/3223 |
| 2019/0320768 A1* | 10/2019 | Shigeta | G06Q 20/00 |
| 2019/0333325 A1* | 10/2019 | Shigeta | G07F 17/3223 |

FOREIGN PATENT DOCUMENTS

| | | |
|---|---|---|
| JP | H06134140 A | 5/1994 |
| JP | 2004070625 A | 3/2004 |
| JP | 2009066172 A | 4/2009 |
| JP | 2009066173 A | 4/2009 |
| JP | 2014504164 A | 2/2014 |

OTHER PUBLICATIONS

European Search Report dated Jan. 19, 2018 issued in corresponding EP Application 17202306.1 cites the patent documents above.
Notice of Allowance dated Apr. 15, 2020 issued in corresponding/ family U.S. Appl. No. 16/507,615 cites the patent documents above.
Office Action dated Dec. 3, 2020 issued in CN Application 201711143771.6 cites the patent documents above.
Office Action dated Dec. 3, 2020 issued in CN Application 201780083111.5 cites the patent documents above.
Office Action dated Jun. 29, 2021 issued in JP Application 2018-551640 cites the patent document above.

* cited by examiner

Fig. 12

| BAR CODE READER |
|---|
| Ca1 |

| RFID READER |
|---|
| bwg |
| dkg |
| amr |
| . |
| . |
| . |
| bbr |
| cjb |

| INFRARED CAMERA |
|---|
| 000011 |
| 000021 |
| 000031 |
| . |
| . |
| . |
| 000992 |
| 001002 |

| VISIBLE LIGHT CAMERA |
|---|
| RED |
| RED |
| RED |
| . |
| . |
| . |
| BLUE |
| BLUE |

INSPECTION SYSTEM AND INSPECTION DEVICE

CROSS REFERENCE TO RELATED APPLICATION

This nonprovisional application is a national phase application under 35 U.S.C. § 371 of International Application No. PCT/JP2017/040920 filed 14 Nov. 2017, which claims priority to Japanese Patent Application No. 2016-225540 filed Nov. 18, 2016, the entire contents of each of which are hereby incorporated by reference.

TECHNICAL FIELD

The present invention relates to an inspection system and an inspecting device which are capable of inspecting a gaming chip, and more particularly to, an inspection system and an inspecting device which are capable of inspecting a plurality of gaming chips contained in a case.

BACKGROUND

Gaming chips used in game halls such as casinos are manufactured in factories and then transported to game halls, stored in a storage, and moved from the storage to cashiers or game tables in the hall, but it is necessary to prevent gaming chips from being stolen or being replaced with fake gaming chips in the process of transporting, storing, and moving. To this end, a case containing gaming chips is used. If a plurality of gaming chips are contained in the case and, then the case is sealed, it is possible to discover a situation in which the gaming chips are withdrawn from the case after the sealing.

As a gaming chip in which a radio tag storing identification information or type information is internally installed, and optically readable code information indicating the identification information or the type information is assigned to a side surface is known (for example, JP 2009-66172 A).

A system using a gaming chip is disclosed in JP 2009-66172 A. In the system, the number of gaming chips placed on a betting board of a game table is calculated on the basis of identification information stored in a radio tag, the number of gaming chips is calculated on the basis of identification information assigned to a side surface, and the calculated numbers of gaming chips are compared. Accordingly, it is possible to detect an unauthorized gaming chip when the unauthorized gaming chip is used in the game table.

SUMMARY OF THE INVENTION

Problem to be Solved by the Invention

However, since the system disclosed in JP 2009-66172 A detects a fraud by calculating the number of bet gaming chips (placed on the betting board), the system is unable to inspect a plurality of gaming chips contained in the case in a state where the gaming chips are contained in the case and detect the unauthorized gaming chip.

In this regard, it is an object of the embodiment to provide an inspection system and an inspecting device which are capable of inspecting a plurality of gaming chips contained in a case in a state where the gaming chips are contained in the case.

Solution to Solve the Problem

An inspection system according to a first aspect of the embodiment is an inspection system that inspects a gaming chip having at least first gaming chip information and second gaming chip information, the second gaming chip information is arranged on a side surface of the gaming chip in an optically readable form, the inspection system includes a case that contains a plurality of gaming chips in a stacked manner and an inspecting device that inspects the gaming chip contained in the case, wherein the inspecting device includes a first reading device that acquires the first gaming chip information of the gaming chip contained in the case, a second reading device that optically reads the side surface of the gaming chip contained in the case and acquires the second gaming chip information, and a determining unit that determines whether a plurality of gaming chips contained in the case are pass or fail by determining the authenticity or damages of all the gaming chips contained the case or the number of gaming chips for each value using the first gaming chip information acquired by the first reading device and the second gaming chip information acquired by the second reading device.

With this configuration, since both the first reading unit and the second reading unit acquire the first gaming chip information and the second gaming chip information from the gaming chip contained in the case, it is possible to inspect the gaming chips contained in the case. Further, since two pieces of information, that is, the first gaming chip information and the second gaming chip information are acquired from the gaming chip, and the inspection is performed, the pass/fail determination can be reliably performed.

In an inspection system according to a second aspect of the embodiment, in the inspection system of the first aspect, the first gaming chip information and the second gaming chip information in a common gaming chip include common information, and the determining unit determines that a plurality of gaming chips contained in the case are fail when common information portions of a plurality of pieces of first gaming chip information acquired by the first reading device do not coincide with common information portions of a plurality of pieces of second gaming chip information acquired by the second reading device.

With this configuration, when an unauthorized gaming chip in which the common information portion of the first gaming chip information does not coincide with the common information portion of the second gaming chip information is contained in the case, the determining unit can determine that the gaming chips contained in the case are fail.

For example, when common identification information is recorded in the radio tag and the side surface, fail is determined if a plurality of pieces of identification information read out from a plurality of radio tags do not coincide completely with a plurality of pieces of identification information read out from a plurality of side surfaces. Further, when a value of the gaming chip is recorded in the radio tag and the side surface, fail is determined if the number of each value read from the radio tag does not coincide with the number of each value read from the side surface.

In an inspection system according to a third aspect of the embodiment, in the inspection system of the first aspect, both or either of the first gaming chip information and the second gaming chip information includes individual identification information individually identifying the gaming chip.

In an inspection system according to a fourth aspect of the embodiment, in the inspection system of the first aspect, the second gaming chip information includes information indicated by a designated color indicating the value of the gaming chip and is information indicating the value of the gaming chip through the designated color.

In an inspection system according to a fifth aspect of the embodiment, in the inspection system of the third aspect, both the first gaming chip information and the second gaming chip information include individual identification information, and a plurality of gaming chips contained in the case are determined to be fail when the individual identification information of a plurality of pieces of first gaming chip information acquired by the first reading device does not coincide with the individual identification information of a plurality of pieces of second gaming chip information acquired by the second reading device.

With this configuration, when an unauthorized gaming chip in which the individual identification information of the first gaming chip information does not coincide with the individual identification information of the second gaming chip information is contained in the case, the determining unit determines that the gaming chips contained in the case are fail.

In the inspection system of the first aspect, an inspection system according to a sixth aspect of the embodiment includes a storage unit that stores the individual identification information of at least the first gaming chip information or the second gaming chip information of a plurality of gaming chips to be contained in the case, and the determining unit determines that a plurality of gaming chips contained in the case are fail when the individual identification information of a plurality of pieces of first gaming chip information acquired by the first reading device or a plurality of pieces of second gaming chip information acquired by the second reading device does not coincide with the individual identification information of the first gaming chip information or the second gaming chip information stored in the storage unit.

With this configuration, when an unauthorized gaming chip in which the first gaming chip information or the second gaming chip information is incorrect is contained in a case, the determining unit can determine that the gaming chips contained in the case are fail.

For example, when the individual identification information indicated by characters is recorded in the radio tag, and the individual identification information indicated by numbers is recorded on the side surface, a plurality of pieces of individual identification information indicated by characters are stored in the storage unit for the radio tag for each case, a plurality of pieces of individual identification information indicated by numbers are stored for the side surface, and fail is determined when a plurality of pieces of individual identification information read out from a plurality of radio tags do not coincide with a plurality of pieces of individual identification information stored in the storage unit for the radio tag of the case or when a plurality of pieces of individual identification information read out from a plurality of side surfaces do not coincide with a plurality of pieces of individual identification information stored in the storage unit for the side surface of the case.

In the inspection system of the first aspect, an inspection system according to a seventh aspect of the embodiment further includes a storage unit that stores a correspondence relation between the first gaming chip information and the second gaming chip information, and the determining unit determines that the plurality of gaming chips contained in the case are fail when a plurality of pieces of first gaming chip information acquired by the first reading device and a plurality of pieces of second gaming chip information acquired by the second reading device do not coincide with the correspondence relation stored in the storage unit.

With this configuration, when a gaming chip in which the correspondence relation between the first gaming chip information and the second gaming chip information is inaccurate is contained in the case, fail can be determined.

For example, when the identification information is recorded in the radio tag, and the value is recorded in the side surface, any value is allocated to each piece of identification information and stored in the storage unit, the number of each value is obtained with reference to the storage unit for a plurality of pieces of identification information read out from the plurality of radio tags, and fail is determined when the number of each value read out from the side surface does not coincide with the obtained number of each value. Conversely, the same applies when the value is recorded in the radio tag, and the identification information is recorded in the side surface. In these cases, the storage unit need not store which case contains a gaming chip of which identification information.

In an inspection system according to an eighth aspect of the embodiment, in the inspection system of any one of the first to seventh aspects, the determining unit determines that a plurality of gaming chips contained in the case are fail when the number of pieces of the first gaming chip information acquired by the first reading device and the number of pieces of the second gaming chip information acquired by the second reading device are not a predetermined number.

With this configuration, when the gaming chip is withdrawn from the case or the gaming chip is added to the case, the determining unit can determine that the gaming chips contained in the case are fail.

For example, when the number of gaming chips contained in the case is 100, fail is determined when any one of the number of pieces of the first gaming chip information read from the radio tag and the number of pieces of the second gaming chip information read from the side surface is not 100.

In an inspection system according to a ninth aspect of the embodiment, in the inspection system of any of the first to eighth aspects, the gaming chip includes color information indicating the value of the gaming chip as the second gaming chip information, and includes value information identifying the value of the gaming chip as the first gaming chip information, and the determining unit determines that a plurality of gaming chips contained in the case are fail when the color information does not coincide with the value information of the first gaming chip information.

In an inspection system according to a tenth aspect of the embodiment, in the inspection system of the ninth aspect, the second gaming chip information further includes value information of the gaming chip in addition to the color information, and the determining unit determines that a plurality of gaming chips contained in the case are fail when the value of the gaming chip indicated by the color information in the second gaming chip information does not coincide with both or either of the value information of the second gaming chip information and the value information of the first gaming chip information.

In an inspection system according to an eleventh aspect of the embodiment, in the inspection system of any one of the first to tenth aspects, the gaming chip includes a radio tag having the first gaming chip information.

In an inspection system according to a twelfth aspect of the embodiment, in the inspection system of any one of the first to eleventh aspects, at least either or both of the first gaming chip information and the second gaming chip information include group information indicating a group to which the gaming chip belongs, and the group is a group classified in accordance with the value of the gaming chip, a manufacturing time, a manufacturer, and/or a use game hall.

In an inspection system according to a thirteenth aspect of the embodiment, in the inspection system of the tenth aspect, the determining unit determines that a plurality of gaming chips contained in the case are fail when the color information does not coincide with at least of the value information or common information of the first gaming chip information and the second gaming chip information, and individual identification information.

In an inspection system according to a fourteenth aspect of the embodiment, in the inspection system of the tenth aspect, the determining unit determines the number of a plurality of gaming chips contained in the case for each value or a total amount of the values of all the gaming chips on the basis of the color information or the value information of the first gaming chip information or the second gaming chip information.

In an inspection system according to a fifteenth aspect of the embodiment, in the inspection system of the first aspect, the second gaming chip information includes information indicated by a designated color indicating a value of the gaming chip on a side surface of the gaming chip and is information indicating the value of gaming chip through the designated color, and the second reading device includes a camera that photographs the side surfaces of a plurality of gaming chips contained in the case and an identifying unit that analyzes an image captured by the camera, specifies the designated color of each of the plurality of gaming chips, and specifying the values of the plurality of gaming chips in accordance with the specified designated colors.

With this configuration, the determining unit can perform pass/fail determination using the value information of the gaming chip.

In an inspection system according to a sixteenth aspect of the embodiment, in the inspection system of the fifteenth aspect, the designated color indicating the second gaming chip information is interposed, in a thickness direction of the gaming chip, between common colors which are commonly assigned to gaming chips having different values in the side surface of the gaming chip.

With this configuration, even when a plurality of gaming chips are stacked in the case, the identifying unit can specify types of a plurality of gaming chips in the case by extracting the designated color interposed between the common colors from the image of the side surface.

In an inspection system according to a seventeenth aspect of the embodiment, in the inspection system of the first aspect, the second gaming chip information is notation information which is inscribed on the side surface to be optically readable, and the second reading device includes a camera that photographs the side surfaces of a plurality of gaming chips stacked and contained in the case and an identifying unit that analyzes the image captured by the camera, specifies the notation information of each of the plurality of gaming chips, and specifies the second gaming chip information of each of a plurality of gaming chips in accordance with the specified notation information.

With this configuration, the determining unit can perform the pass/fail determination using the notation information of the gaming chip.

In an inspection system according to an eighteenth aspect of the embodiment, in the inspection system of the seventeenth aspect, the notation information is inscribed using infrared reaction ink which emits in response to infrared rays or infrared absorption ink which absorbs infrared rays, and the camera is an infrared camera.

With this configuration, it is possible to cause identification information attached to the side surface to be invisible under natural light.

In an inspection system according to a nineteenth aspect of the embodiment, in the inspection system of the seventeenth aspect, the notation information is inscribed using ink that emits light in response to ultraviolet rays, and the inspecting device includes an ultraviolet irradiating unit that irradiates the side surfaces of a plurality of gaming chips contained in the case with ultraviolet rays.

With this configuration, it is possible to cause identification information attached to the side surface to be invisible under natural light.

In an inspection system according to a twentieth aspect of the embodiment, in the inspection system of the first aspect, the case has a seal which is broken when the case is opened to allow the contained gaming chip to be withdrawn, and the inspecting device further includes a detecting unit that detects an unbroken seal, and the determining unit determines that a plurality of gaming chips contained in the case are fail when the unbroken seal is not detected by the detecting unit.

With this configuration, when the seal is broken, the determining unit can determine that the gaming chips contained in the case are fail.

In an inspection system according to a twenty-first aspect of the embodiment, in the inspection system of the first aspect, the case includes a light transmitting portion, and the second reading device optically reads the side surface of the gaming chip contained in the case through the light transmitting portion.

With this configuration, the second gaming chip information can be read in a state where the case is closed.

In the inspection system according to a twenty-second aspect of the embodiment, in an inspection system according to the twenty-first aspect, the light transmission portion is configured with a transparent member.

With this configuration, it is possible to provide a sealed structure including the light transmitting portion in the case.

In an inspection system according to a twenty-third aspect of the embodiment, in the inspection system of the first aspect, the inspecting device includes a case receiving portion that receives the case.

With this configuration, when the case is arranged in the case receiving portion, the first gaming chip information and the second gaming chip information can be read.

In an inspection system according to a twenty-fourth aspect of the embodiment, in the inspection system of the twenty-first aspect, the case is portable.

With this configuration, it is possible to inspect the gaming chips in the case at an arbitrary point in the process of moving the case from a factory to a table or a cashier.

In an inspection system according to a twenty-fifth aspect of the embodiment, in the inspection system of the first aspect, the case is a two-stage chip float or chip tray holding the gaming chips in the game table.

An inspection system according to a twenty-sixth aspect of the embodiment is an inspection system that inspects gaming chips to which a designated color indicating a value on a side surface and notation information inscribed to be optically readable are assigned and includes a case that contains a plurality of gaming chips in a stacked manner and an inspecting device that inspects the gaming chips contained in the case, wherein the inspecting device includes a camera that photographs the side surfaces of the gaming chips contained in the case, an identifying unit that analyzes an image captured by the camera and specifies the designated color and the notation information of each of the plurality of gaming chips, and a determining unit that determines whether the gaming chips are pass or fail for each case on the basis of the designated color and the notation information specified by the identifying unit.

With this configuration, since the identifying unit specifies the designated color and the notation information for the gaming chips contained in the case, it is possible to inspect the gaming chips contained in the case. Further, since two pieces of information, that is, the designated color and the notation information are specified from the side surface of the gaming chip, and the inspection is performed, the pass/fail determination can be performed reliably.

An inspection system according to a twenty-seventh aspect of the embodiment is an inspection system that inspects gaming chips to which a designated color indicating a value on a side surface is assigned, a radio tag storing gaming chip information being embedded in each of the gaming chips, and the inspection system includes a case that contains a plurality of gaming chips in a stacked manner and an inspecting device that inspects the gaming chips contained in the case, wherein the inspecting device includes a reading unit that reads a radio tag of the gaming chip contained in the case and acquires the gaming chip information, a camera that photographs the side surfaces of the gaming chips contained in the case, an identifying unit that analyzes an image captured by the camera and specifies the designated color of each of the plurality of gaming chips, and a determining unit that determines whether the gaming chips are pass or fail for each case on the basis of the gaming chip information acquired by the reading unit and the designated color specified by the identifying unit.

With this configuration, since the reading unit acquires the gaming chip information from the gaming chip contained in the case, and the identifying unit also specifies the designated color for the gaming chip contained in the case, it is possible to inspect the gaming chips contained in the case. Further, since two pieces of information, that is, the gaming chip information and the designated color are specified from the side surface of the gaming chip, and the inspection is performed, the pass/fail determination can be performed reliably.

An inspecting device according to a twenty-eighth aspect of the embodiment is an inspecting device that inspects a plurality of gaming chips contained in a case in a stacked manner, a radio tag storing first gaming chip information being embedded in each of the gaming chips, optically readable second gaming chip information being assigned to a side surface of the gaming chip, and the inspecting device includes a first reading device that reads the radio tags of a plurality of gaming chips contained in the case and acquires the first gaming chip information, a second reading device that optically reads the side surfaces of a plurality of gaming chips contained in the case and acquires the second gaming chip information, and a determining unit that determines whether the gaming chips are pass or fail for each case on the basis of the first gaming chip information acquired by the first reading device and the second gaming chip information acquired by the second reading device.

With this configuration, since both the first reading unit and the second reading unit acquire the first gaming chip information and the second gaming chip information from the gaming chips contained in the case, it is possible to inspect the gaming chips contained in the case. Further, since two pieces of information, that is, the first gaming chip information and the second gaming chip information are acquired from the gaming chips, and the inspection is performed, the pass/fail determination can be reliably performed.

An inspecting device according to a twenty-ninth aspect of the embodiment is an inspecting device that inspect a plurality of gaming chips contained in a case in a stacked manner, a designated color indicating a value on a side surface and optically readable notation information being assigned to each of the gaming chips, and the inspecting device includes a camera that photographs the side surfaces of a plurality of gaming chips contained in the case, an identifying unit that analyzes an image captured by the camera and specifies the designated color and the notation information of each of the plurality of gaming chips, and a determining unit that determines whether the gaming chips are pass or fail for each case on the basis of the designated color and the notation information specified by the identifying unit.

An inspecting device according to a thirtieth aspect of the embodiment is an inspecting device that inspects a plurality of gaming chips contained in a case in a stacked manner, a radio tag storing gaming chip information being embedded in each of the gaming chips, a designated color indicating a value on a side surface being assigned to each of the gaming chips, and the inspecting device includes a reading unit that reads the radio tags of a plurality of gaming chips contained in the case and acquires the gaming chip information, a camera that photographs the side surfaces of a plurality of gaming chips contained in the case, an identifying unit that analyzes an image captured by the camera and specifies the designated color of each of the plurality of gaming chips, and a determining unit that determines whether the gaming chips are pass or fail for each case on the basis of the gaming chip information acquired by the reading unit and the designated color specified by the identifying unit.

An inspection system according to a thirty first aspect of the embodiment is an inspection system that inspects gaming chip, a radio tag storing gaming chip information being embedded in each of the gaming chips, and the inspection system includes a case that contains a plurality of gaming chips in a stacked manner and an inspecting device that inspects the gaming chips contained in the case, wherein the inspecting device includes a reading unit that reads the radio tags of the gaming chips contained in the case and acquires the gaming chip information, and a determining unit that determines whether the gaming chips are pass or fail for each case on the basis of the gaming chip information acquired by the reading unit, and a storage unit that stores the gaming chip information of a plurality of gaming chips to be contained in the case, and the determining unit determines that a plurality of gaming chips contained in the case are fail when a plurality of pieces of gaming chip information acquired by the reading unit do not coincide with the gaming chip information stored in the storage unit.

An inspecting device according to a thirty second aspect of the embodiment is an inspecting device that inspects a plurality of gaming chips contained in a case in a stacked manner, a radio tag storing gaming chip information being embedded in each of the gaming chips, and the inspecting device includes a reading unit that reads the radio tags of a plurality of gaming chips contained in the case and acquires the gaming chip information and a determining unit that determines whether the gaming chips are pass or fail for each case on the basis of the gaming chip information acquired by the reading unit.

A case according to a thirty third aspect of the embodiment is a case that contains a plurality of gaming chips in a stacked manner, wherein the case is used in the inspection system of the first to twenty seventh aspect of the embodiment.

A case according to a thirty fourth aspect of the embodiment is a case that contains a plurality of gaming chips in a stacked manner, wherein the case is configured by combining an upper portion and a lower portion, the upper portion made of transparent resin, and the case has a structure capable of reading a designation color representing the value attached to the side face of the contained gaming chip or notation information inscribed to be optically readable on the side face by allowing light to pass through the upper portion or a structure capable of reading an RFID tag embedded in the contained gaming chip with an RFID reader.

In the case according to a thirty-fifth aspect of the embodiment, in the case of thirty-fourth aspect, the case is given a case identification information for uniquely specifying the case.

In the case according to a thirty-sixth aspect of the embodiment, in the case of thirty-fifth aspect, the case identification information is related to gaming chip information of the contained gaming chip, the gaming chip information is capable of optically reading or capable of reading by a RFID reader.

In the case according to thirty-seventh aspect of the embodiment, in a case according to any one of the thirty-fourth to thirty-sixth aspects, a top surface of the upper portion is formed as a flat surface.

A case according to a thirty-eighth aspect of the embodiment is a case that contains a plurality of gaming chips in a stacked manner, the case is used in an inspection system that inspects a gaming chip having at least first gaming chip information and second gaming chip information, wherein an inspecting device used in the inspection system comprising: a first reading device that acquires the first gaming chip information of the gaming chip contained in the case, a second reading device that optically reads the side surface of the gaming chip contained in the case and acquires the second gaming chip information; and a determining unit that determines whether a plurality of gaming chips contained in the case are pass or fail by determining the authenticity or damages of all the gaming chips contained the case or the number of gaming chips for each value using the first gaming chip information acquired by the first reading device and the second gaming chip information acquired by the second reading device.

A case according to a thirty-ninth aspect of the embodiment is a case that contains a plurality of gaming chips in a stacked manner, the case is used in an inspection system that inspects gaming chips to which a designated color indicating a value on a side surface and notation information inscribed to be optically readable are assigned, wherein an inspecting device used in the inspection system comprising: a camera that photographs the side surfaces of the gaming chips contained in the case; an identifying unit that analyzes an image captured by the camera and specifies the designated color and the notation information of each of the plurality of gaming chips; and a determining unit that determines whether the gaming chips are pass or fail for each case on the basis of the designated color and the notation information specified by the identifying unit.

A case according to a fortieth aspect of the embodiment is a a case that contains a plurality of gaming chips in a stacked manner, the case is used in an inspection system that inspects gaming chips to which a designated color indicating a value on a side surface is assigned, a radio tag storing gaming chip information being embedded in each of the gaming chips, wherein an inspecting device used in the inspection system comprising: a reading unit that reads a radio tag of the gaming chip contained in the case and acquires the gaming chip information; a camera that photographs the side surfaces of the gaming chips contained in the case; an identifying unit that analyzes an image captured by the camera and specifies the designated color of each of the plurality of gaming chips; and a determining unit that determines whether the gaming chips are pass or fail for each case on the basis of the gaming chip information acquired by the reading unit and the designated color specified by the identifying unit.

A case according to a forty-first aspect of the embodiment is a case that contains a plurality of gaming chips in a stacked manner, the case is used in an inspection system that inspects gaming chip, a radio tag storing gaming chip information being embedded in each of the gaming chips, wherein an inspecting device used in the inspection system comprising: a reading unit that reads the radio tags of the gaming chips contained in the case and acquires the gaming chip information; a determining unit that determines whether the gaming chips are pass or fail for each case on the basis of the gaming chip information acquired by the reading unit; and a storage unit that stores the gaming chip information of a plurality of gaming chips to be contained in the case.

An inspection system according to a forty-second aspect of the embodiment is an inspection system that inspects a gaming chip having at least first gaming chip information and second gaming chip information, wherein the second gaming chip information is arranged on the gaming chip in a manner capable of reading by a method different from a method of reading the first gaming chip information, the inspection system comprising: a case that contains a plurality of gaming chips in a stacked manner; and an inspecting device that inspects the gaming chip contained in the case, a first reading device that acquires the first gaming chip information of the gaming chip contained in the case, a second reading device that acquires the second gaming chip information of the gaming chip contained in the case; and a determining unit that determines whether a plurality of gaming chips contained in the case are pass or fail by determining the authenticity or damages of all the gaming chips contained the case or the number of gaming chips using the first gaming chip information acquired by the first reading device and the second gaming chip information acquired by the second reading device.

A case according to a forty-third aspect of the embodiment is a case using for the inspection system according to the forty-second aspect, wherein the first gaming chip information is stored in a radio tag of the gaming chip, the case contains a plurality of the gaming chips in a stacked manner, and the case contains a plurality of gaming chips to be inspected by the inspection system, the inspection system determining whether the gaming chips are pass or fail for each case on the basis of a gaming chip information, the gaming chip information is acquired by a reading unit that reads the radio tags of the gaming chips contained in the case and acquires the gaming chip information.

A gaming chip according to a forty-fourth aspect of the embodiment is a gaming chip to be inspected by the inspection system according to the forty-second aspect, wherein the first gaming chip information is stored in a radio tag of the gaming chip, the case contains a plurality of the gaming chips in a stacked manner, a gaming chip information is acquired from a radio tag of the gaming chip contained in the case by the reading unit, and the gaming chip has a configuration in which the inspection system determines whether the gaming chips are pass or fail for each case on the basis of the gaming chip information.

Effect of the Invention

According to the present invention, since both the first reading unit and the second reading unit acquire the first gaming chip information and the second gaming chip information from the gaming chip contained in the case, it is possible to inspect the gaming chips contained in the case. Further, since two pieces of information, that is, the first gaming chip information and the second gaming chip information are acquired from the gaming chip, and the inspection is performed, the pass/fail determination can be reliably performed.

BRIEF DESCRIPTION OF THE DRAWINGS

FIG. 12 is a diagram illustrating an example of content of read information according to the embodiment of the present invention;

DETAILED DESCRIPTION OF NON-LIMITING EXAMPLE EMBODIMENTS

Hereinafter, embodiments of the present invention will be described with reference to the accompanying drawings. Further, embodiments to be described below are merely examples for carrying out the present invention, and the present invention is not limited to a specific configuration to be described below. When the present invention is carried out, a concrete configuration according to an embodiment may be appropriately employed.

<Configuration of Inspection System>

Figure 1:
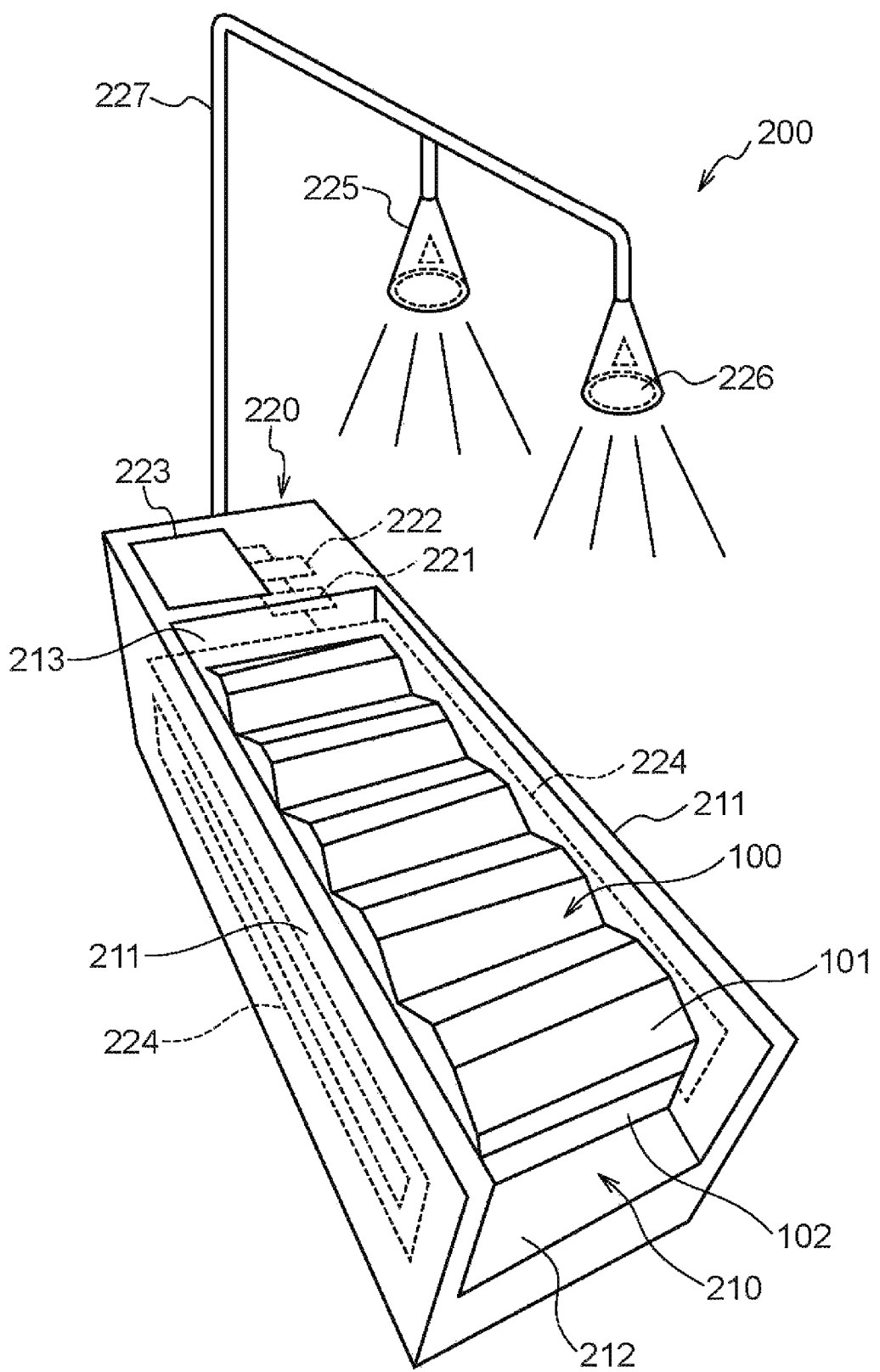
FIG. 1 is a diagram illustrating a configuration of an inspection system according to an embodiment of the present invention.

FIG. 1 is a diagram illustrating a configuration of an inspection system according to an embodiment of the present invention. An inspection system 1 includes a case 100 that contains gaming chips in a stacked state and an inspecting device 200 that inspects a plurality of gaming chips contained in the case 100 in the stacked state in a state where the gaming chips are contained in the case 100.

The case 100 has a substantially rectangular parallelepiped shape and is made of transparent resin. The case 100 contains disc shaped gaming chips C in a stacked state. In the case 100, five columns each containing 20 gaming chips C are formed, and a total of 100 gaming chips C can be contained. The case 100 can be carried (portable) in a state where the gaming chips C are contained. The case 100 includes an upper portion 101 and a lower portion 102 which are separable, and when the upper portion 101 and the lower portion 102 are separated, the gaming chips C can be contained in the case 100, and the gaming chips C can be withdrawn from the case 100.

The inspecting device 200 includes a receiving unit 210 and a main body portion 220. The inspecting device 200 can receive the case 100 through the receiving unit 210. The receiving unit 210 has a substantially rectangular parallelepiped shape in which an upper surface and a front surface are opened as a whole, and the receiving unit 210 is formed by left and right side walls 211, a bottom portion 212, and an inner wall 213 and has a width, a height, and a depth in which the case 100 can fit exactly.

The main body portion 220 is installed behind the inner wall 213 of the receiving unit 210 and includes an RFID reader 221, a computer 222, and a display unit 223. The main body portion 220 further includes an infrared camera 225 and a visible light camera 226. The infrared camera 225 and the visible light camera 226 are attached to the end of an arm 227 to photograph the side surface of the gaming chip C contained in the case 100 from the upper surface side of the case 100 contained in the receiving unit 210.

The RFID reader 221, the display unit 223, the infrared camera 225, and the visible light camera 226 are connected to the computer 222. An RFID antenna 224 is connected to the RFID reader 221. The RFID antenna 224 extends from the RFID reader 221 and extends spirally in the left and right sidewalls 211. In other words, a spiral RFID antenna 224 is laid in each of the left and right sidewalls 211, and each RFID antenna 224 is connected to the RFID reader 221.

The display unit 223 includes a liquid crystal panel. A touch sensor may be installed on the liquid crystal panel, and the display unit 223 may be configured as a touch panel.

<Structure of Gaming Chip>

Figure 2:
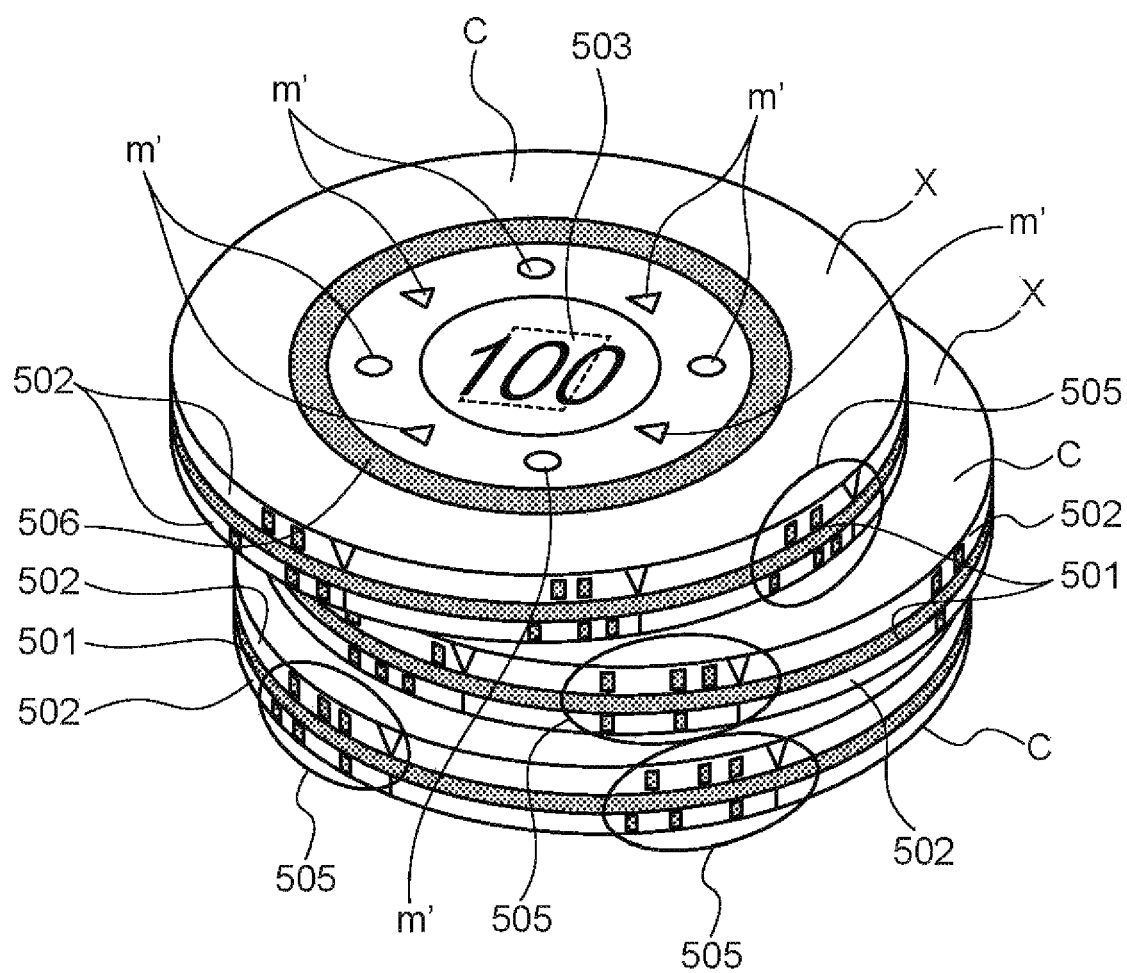
FIG. 2 is a perspective view of a gaming chip according to the embodiment of the present invention.
Figure 3:
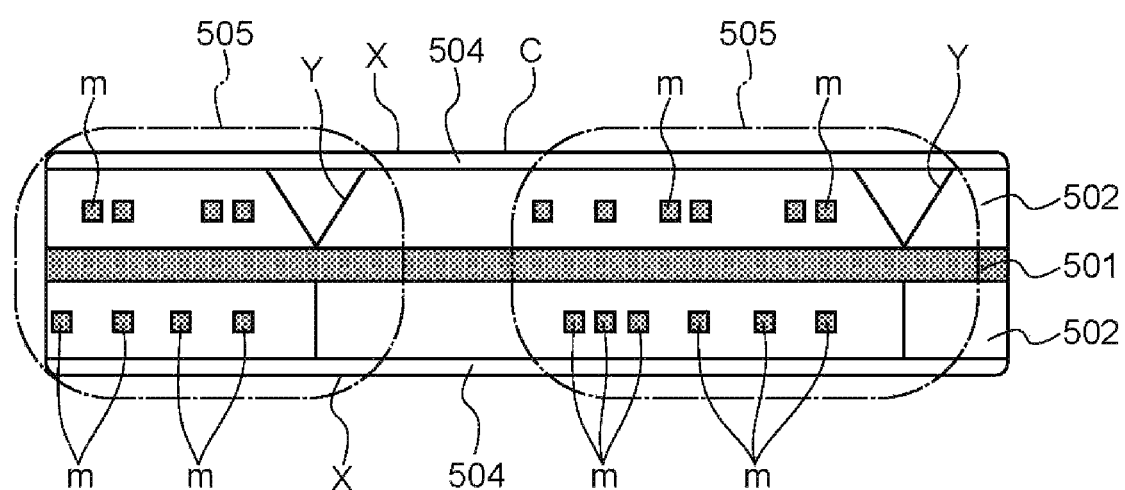
FIG. 3 is a side view of a gaming chip according to the embodiment of the present invention.

FIG. 2 is a perspective view of the gaming chip C according to an embodiment of the present invention, and FIG. 3 is a side view of the gaming chip C according to an embodiment of the present invention. The gaming chip C has a designated color layer 501 which is characterized by a designated color in the middle and a common color layer 502 which is characterized by a common color on both sides of the designated color layer 501 in the middle in a thickness direction (upper and lower sides in FIG. 3), and a stripe pattern (in the thickness direction) is formed on the side surface.

An RFID tag 503 is inserted between the designated color layer 501 and one common color layer 502 of the gaming chip C as a radio tag. For example, individual identification information individually identifying (uniquely specifying) the gaming chip C and value (type) information are stored in the RFID tag 503 as the gaming chip information of the gaming chip C. A transparent layer 504 is formed as the outermost layer of the gaming chip C. In other words, the gaming chip C includes the designated color layer 501 which is an intermediate layer, the common color layers 502 sandwiching the designated color layer 501 from both sides, and the transparent layers 504 which are the outermost layers of both sides.

The gaming chip C is formed such that five elongated layers of plastic materials (the transparent layer 504, the common color layer 502, the designated color layer 501, the common color layer 502, and the transparent layer 504) are stacked, the RFID tag 503 is arranged between the designated color layer 501 and one common color layer 502 at a predetermined interval at that time, and the five layers of plastic materials are thermocompression bonded and then punched into a circular shape, a rectangular shape, or the like through a press so that one RFID tag 503 is included in one gaming chip C. When the punching is performed through the press, dimensions of a die and a punch of a mold for punching are designed, and R treatment (rounded corner) is applied to the end of the transparent layer 504 of the outermost layer.

The transparent layer 504 may be formed by thermocompression bonding three layers including the designated color layer 501 and the two common color layers 502 and then applying varnish to the surface. Further, the designated color layer 501 and the two common color layers 502 may not be separate members, and the designated color layer 501 and the two common color layers 502 may be formed by applying the designated color (and the common color) to the side surface through inkjet printing or the like after the designated color layer 501 and the two common color layers 502 are integrally formed.

The designated color layer 501 indicates the value (type) of the gaming chip C using a color (a designated color). In other words, the color of the designated color layer 501 is set to a different color (red, green, yellow, blue, or the like) in accordance with the value of the gaming chip C, and thus it is possible to specify the value of the gaming chip C (10 points, 20 points, 100 points, 1000 points, or the like) by checking the color of the designated color layer 501 optically read from the side surface of the gaming chip C. A color common to the gaming chips C having different values (a common color) is assigned to the common color layer 502. The common color is preferably a color lighter than any designated color, and the common color is white in the present embodiment.

Code information 505 indicating the gaming chip information of the gaming chip C is further inscribed on the side surface of the gaming chip C (specifically, the common color layer 502 of the side surface). The code information 505 indicates information by arranging a plurality of marks (square marks in the present embodiment). Since the designated color layer 501 indicates information (the value of the gaming chip C) with color, whereas the code information 505 indicates information with a mark inscribed on the side surface, the code information 505 can be regarded as notation information. Examples of the notation information include a plurality of character strings, a numeric string, and a bar code.

The code information 505 of the present embodiment is repeatedly inscribed with a cycle of 60° in a circumferential direction of the gaming chip C. Accordingly, the perfect code information 505 is included within a range of 120° in the circumferential direction regardless of a direction in which the side surface of the gaming chip C is observed in the circumferential direction. A repetition cycle of the gaming chip C is not limited to 60° and may be repeatedly inscribed at equal intervals in the circumferential direction at least three times.

The code information 505 is inscribed using invisible ink. In the present embodiment, printing is performed by inkjet printing using infrared absorbing ink (specifically, carbon black) that absorbs infrared rays as the invisible ink. Since only a portion on which the code information 505 is printed does not reflect infrared rays, the code information 505 floats when the side surface of the gaming chip C is photographed by the infrared camera 225. In order to cause the printed portion to float clearly, the infrared camera 225 may be equipped with an infrared lamp and irradiate the side surface of the gaming chip C to be photographed with infrared rays.

Further, the invisible ink is not limited to the infrared absorbing ink and may be, for example, infrared reaction ink that emits fluorescence in response to infrared rays or UV ink which emits fluorescence in response to ultraviolet rays. In the case of using the UV ink, the ultraviolet camera is used in place of the infrared camera 225, and black light which irradiates the side surface of the gaming chip C with ultraviolet rays is used to cause the UV ink to emit fluorescence.

Further, in the gaming chip C, a mark m' using the UV ink or the carbon black ink is formed on a surface X of the common color layer 502. The mark m' indicates whether the gaming chip 5 is true or false, and the mark m' becomes visible when irradiated with ultraviolet rays (or infrared rays), and it is indicated whether the gaming chip 5 is true or false in accordance with a combination of shapes of the mark m' and the number of marks m'. The transparent layer 504 is thermocompression bonded or applied on the outermost layer so as to cover a print 506 (such as 100 points) for specifying the game hall or the mark m' on the surface, but embossing treatment or vanish treatment is applied to the transparent layer 504, and thus the gaming chips C are prevented from adhering to each other, and slipping is further improved.

The R treatment (R) is performed on the end of the transparent layer 504 of the outermost layer which has undergone a print 506 (100 points or the like), and the surface of the common color layer 502 is prevented from being deformed in the process of punching the gaming chip C and appearing on the side surface. Further, a sharp edge of the gaming chip C is prevented from remaining and damaging a hand and other gaming chips C. The designated color layer 501 may be formed by one or a plurality of colored layers. Further, metal or ceramics for increasing the weight of the layer may be formed in the layer of the designated color layer 501. Further, the RFID tag 503 may be installed in a space which is formed in a part of the designated color layer 501 or between the designated color layer 501 and the common color layer 502.

Figure 4:
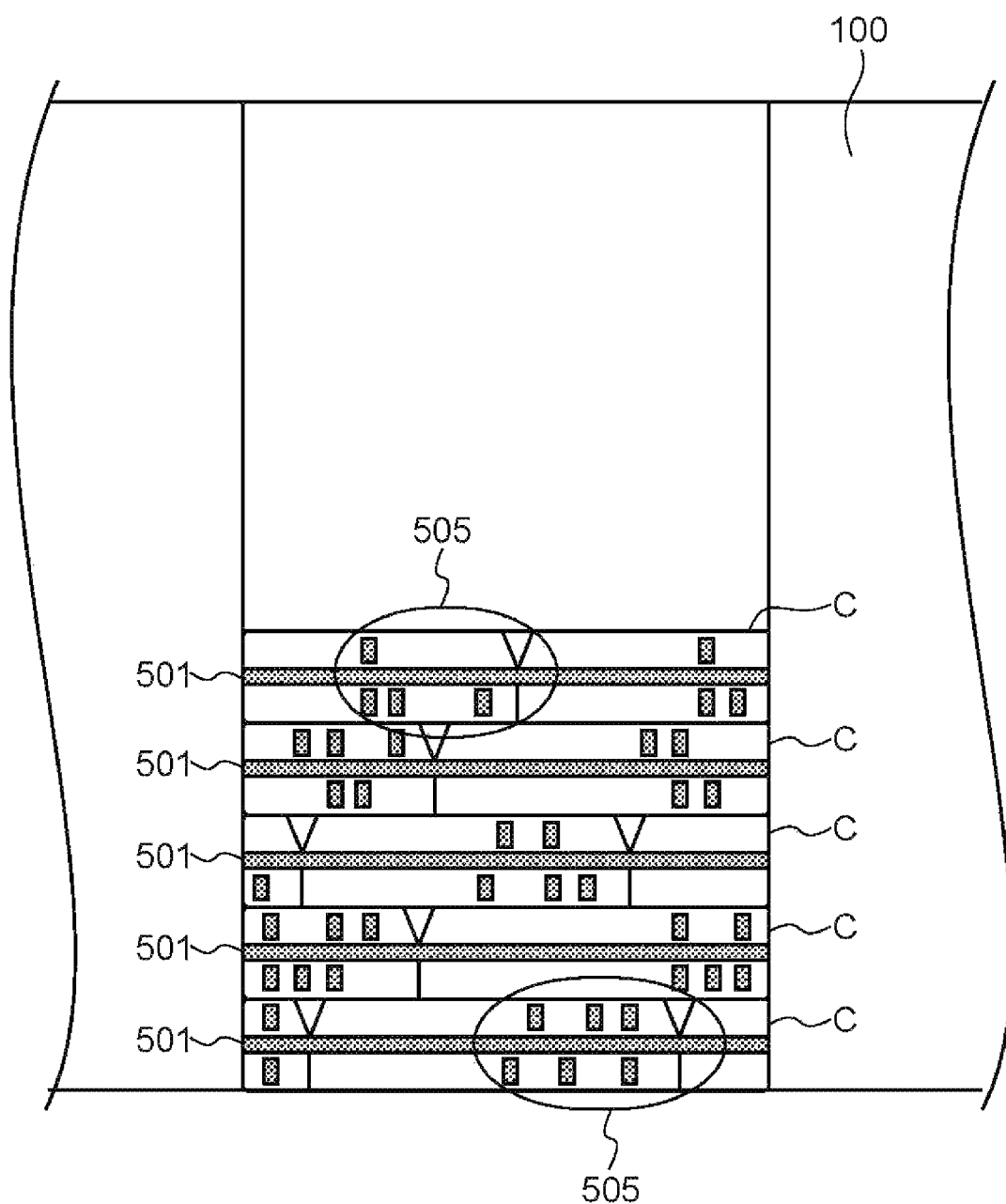
FIG. 4 is a diagram illustrating an example of an image obtained by photographing a plurality of gaming chips in the embodiment of the present invention.

FIG. 4 is a diagram illustrating an example of an image obtained by photographing a plurality of gaming chips C contained in the case 100 through the infrared camera 225 and the visible light camera 226. In this case, the case 100 may be a two-stage chip float (an upper tray portion which is particularly movable in a two-stage chip tray) or a chip tray which holds the gaming chip C in the game table. Even when the gaming chip C is stacked in the case 100 in the vertical direction as illustrated in FIG. 4, the infrared camera 225 and the visible light camera 226 can photograph the code information 505. Further, it is possible to count the number of gaming chips C by counting the designated color layer 501 in the vertical direction. Even with the two-stage tray, when each stage is developed, it is possible to capture the side surfaces of all the gaming chips C contained in the case 100 through the infrared camera 225 and the visible light camera 226.

Figure 5:
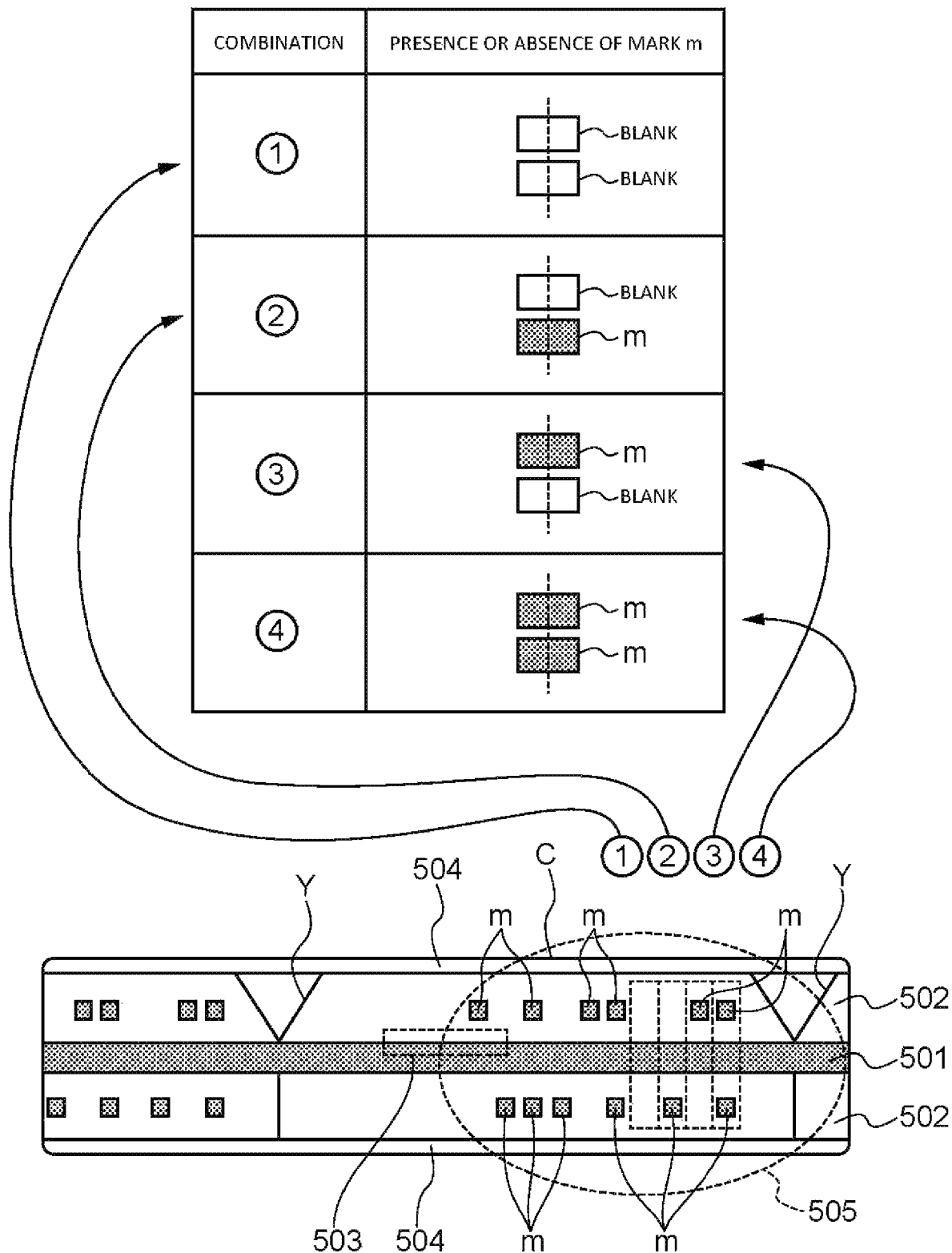
FIG. 5 is a diagram for describing a configuration of code information according to the embodiment of the present invention.

In the present embodiment, the code information 505 is indicated by the marks m arranged in a plurality of rows and a plurality of columns. FIG. 5 is a diagram for describing a configuration of the code information 505. As illustrated in FIG. 5, upper and lower marks m are paired to form one code element. In the example of FIG. 5, one piece of code information 505 is configured with a 10-digit code element. There are four types of patterns of one code element constituted by a pair of upper and lower marks m, four types of information can be indicated by one code element as illustrated in FIG. 5, and thus the code information 505 configured with the 10-digit code element can indicate 10-th power of 4 types of information. A character Y on the side of the 10-digit code element is a direction determination mark Y for determining the direction of the code information 505.

<Configuration of Inspecting Device>

Figure 6:
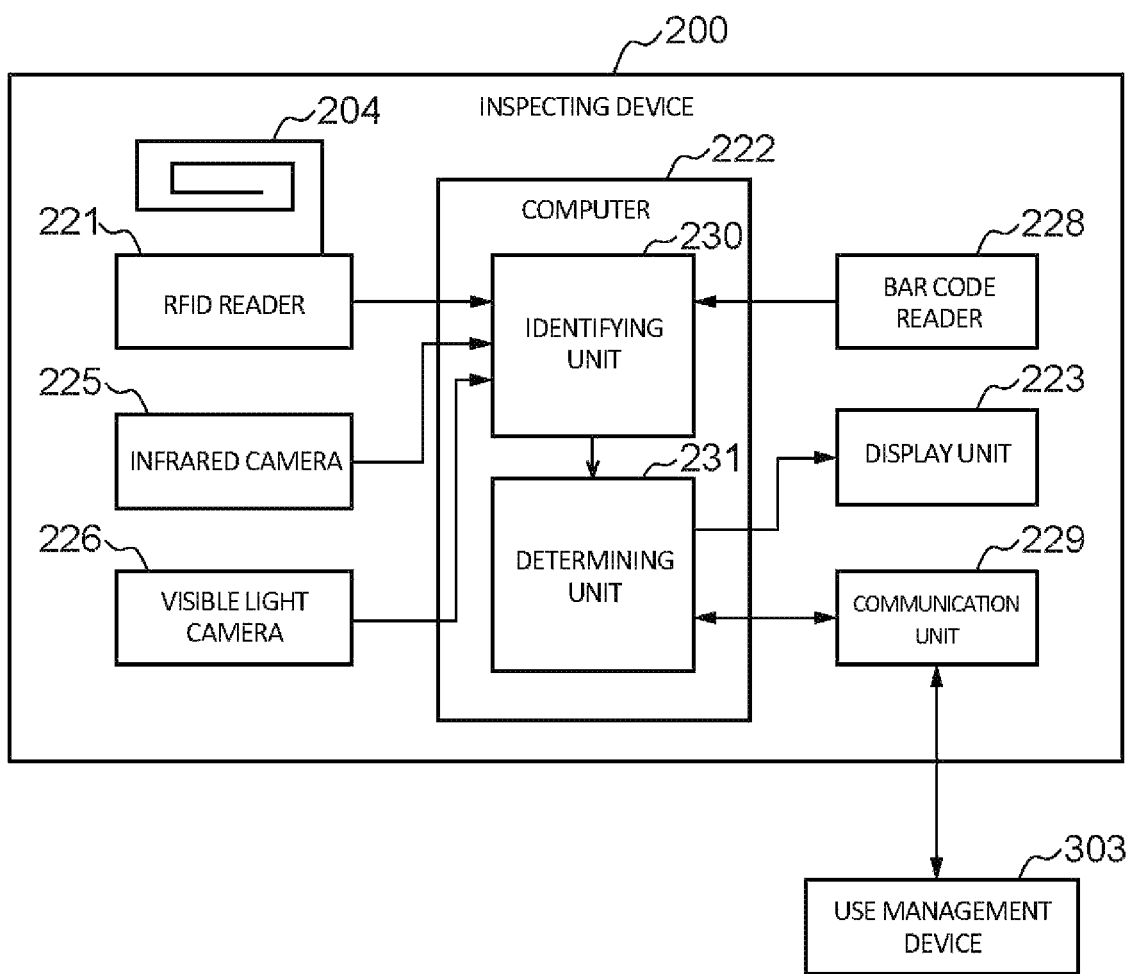
FIG. 6 is a block diagram illustrating a configuration of an inspecting device according to the embodiment of the present invention.

FIG. 6 is a block diagram illustrating a configuration of the inspecting device 200. The inspecting device 200 includes a bar code reader 228 and a communication unit 229 in addition to the RFID reader 221, the computer 222, the display unit 223, the RFID antenna 224, the infrared camera 225, and the visible light camera 226 illustrated in FIG. 1. Further, the computer 222 is configured with a processor (not illustrated), a memory, and the like and functions as an identifying unit 230 and a determining unit 231 when the processor executes an inspection program.

An RFID system is configured with the RFID reader 221, the RFID antenna 224, and the RFID tag 503 embedded in the gaming chip C. The gaming chip information of the gaming chip C stored in the RFID tag 503 embedded in the gaming chip C is read out by the RFID reader 221 in a non-contact manner and used for a process in the computer 222.

The infrared camera 225 includes an infrared transmission filter that transmits only infrared light and captures an infrared image. The infrared image generated by the photographing of the infrared camera 225 is transmitted to the computer 222 and used for a process of the identifying unit 230. The visible light camera 226 captures an image of light of a visible region. A visible light image generated by the photographing of the visible light camera 226 is also transmitted to the computer 222 and used for a process of the identifying unit 230. As illustrated in FIG. 1, the infrared camera 225 and the visible light camera 226 are directed toward the case 100 above the case 100, and photograph the side surfaces of a plurality of gaming chips C in the case 100 over the upper portion 101 of the case 100.

The bar code reader 228 reads the bar code BC attached to the case 100 and acquires case identification information to be described later. The display unit 223 displays a determination result of the determining unit 231 of the computer 222. The communication unit 229 communicates data with a manufacturing management device 302 installed in a factory F or a use management device 303 installed in a game hall P.

<Configuration of Case>

Figure 7:
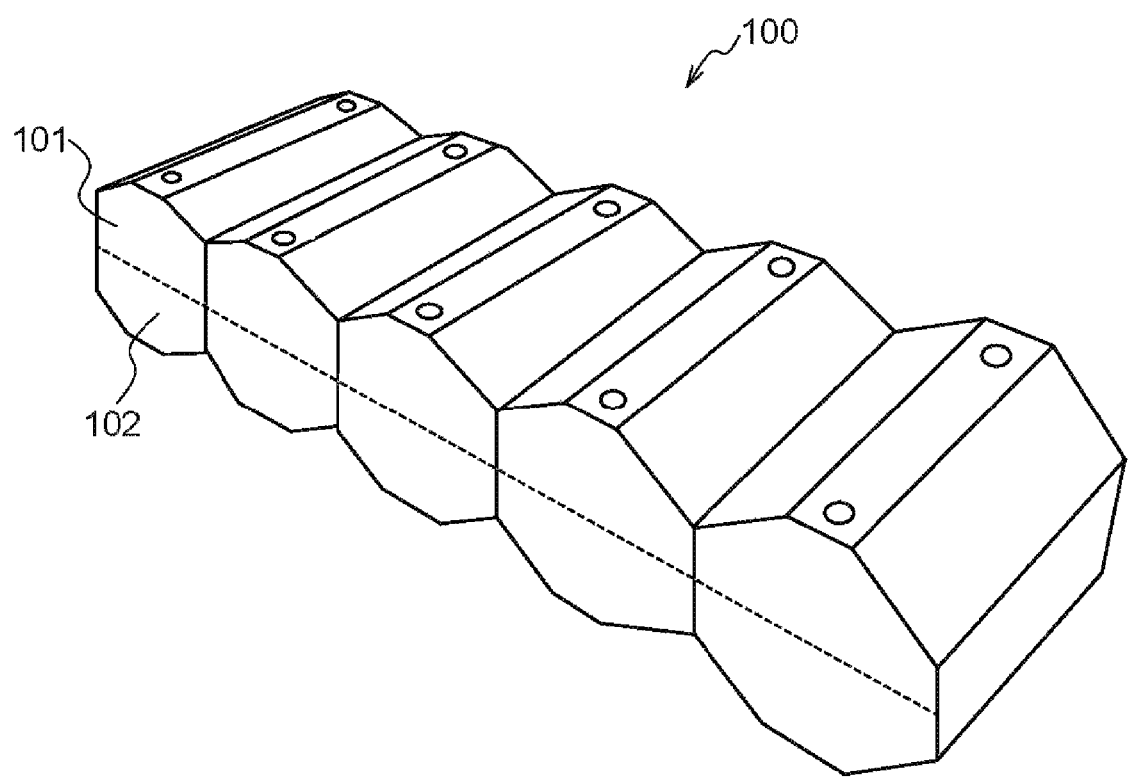
FIG. 7 is a perspective view of a case according to the embodiment of the present invention.

FIG. 7 is a perspective view of a case 100. The case 100 is formed by combining the upper portion 101 and the lower portion 102. In the present embodiment, the upper portion 101 and the lower portion 102 are made of transparent resin. As described above, since the infrared camera 225 and the visible light camera 226 of the inspecting device 200 of the present embodiment (hereinafter referred to simply as a "camera") installed above the receiving unit 210, it is necessary for at least the upper surface of the case 100 to transmit light. In other words, in the case 100, a portion positioned between the receiving unit 210 of the inspecting device 200 and the camera when the case 100 is received by the receiving unit 210 of the inspecting device 200 needs to be a light transmitting portion. In the present embodiment, the case 100 has a sealed structure including the upper portion 101 and the lower portion 102, but the light transmission portion may be in a perforated state.

As described above, the case 100 has a shape in which the five columns in which 20 gaming chips C are stacked and contained are formed in parallel, and in the example of FIG. 7, a cross section of each column is polygonal (octagonal) so that the upper portion 101 and the lower portion 102 substantially follow the shape of the gaming chip C to be contained.

Figure 8:
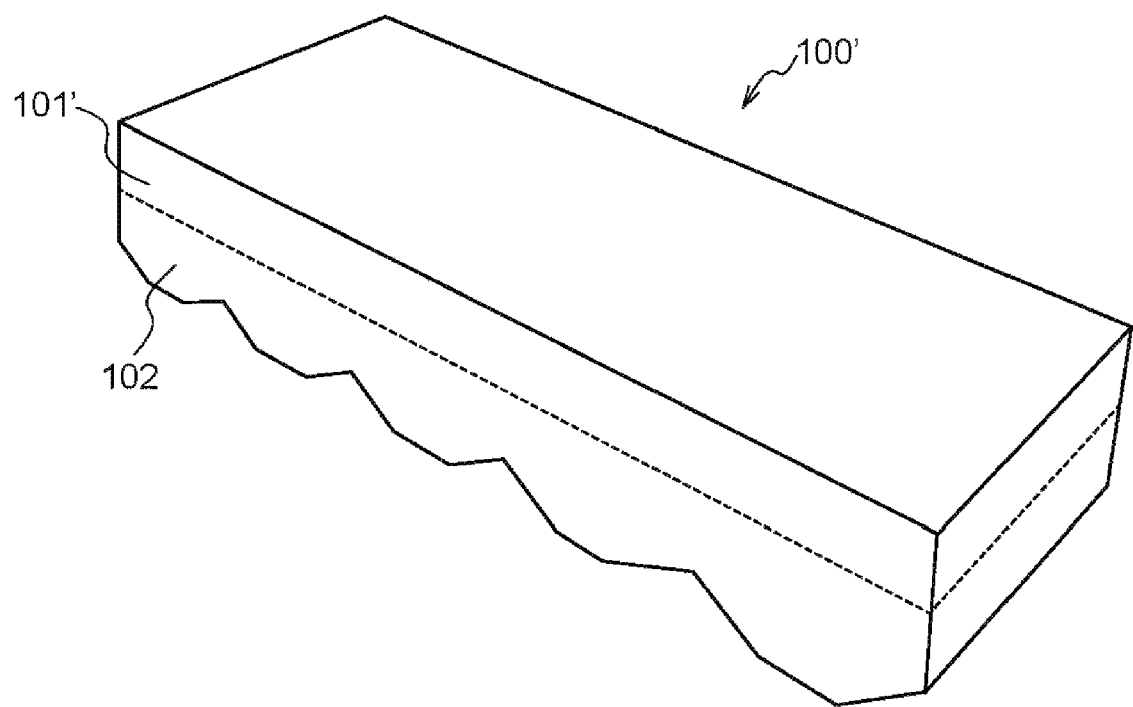
FIG. 8 is a perspective view of a case according to a modified example of the embodiment of the present invention.
Figure 9:
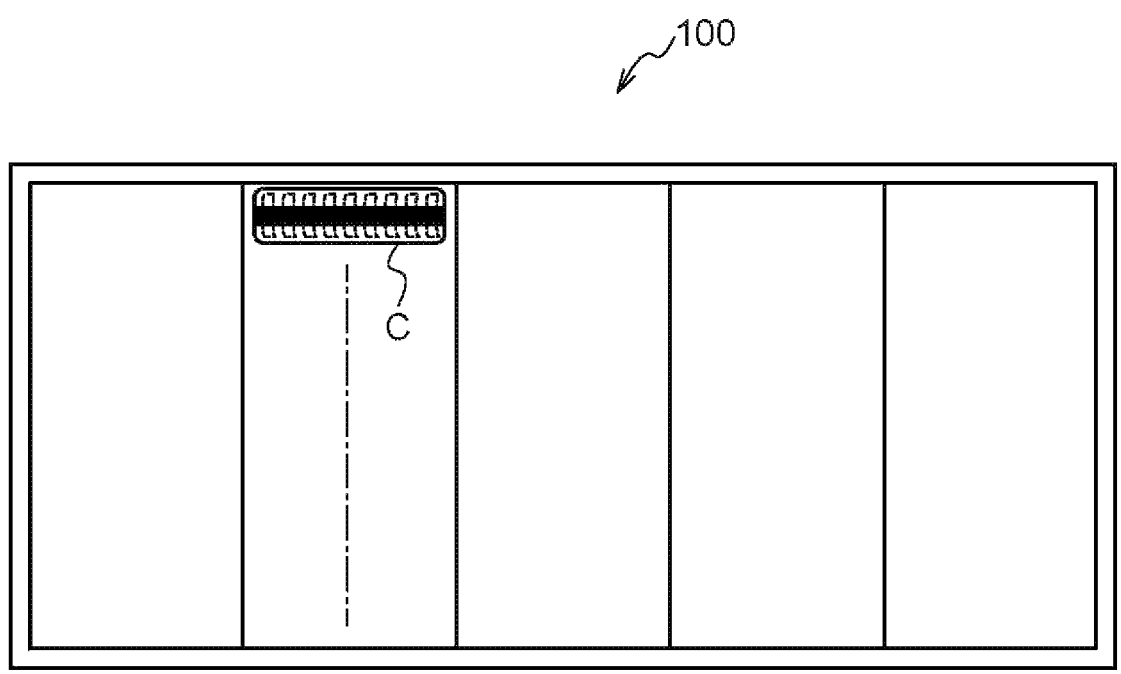
FIG. 9 is a plan view of a case according to a modified example of the embodiment of the present invention.

FIG. 8 is a perspective view of a case 100' according to a modified example, and FIG. 9 is a plan view of the case 100'. The case 100' also includes an upper portion 101' and a lower portion 102 made of a transparent resin. In the present modified example, the upper surface of the upper portion 101' facing the camera is formed as a plane surface. Since the surface facing the camera is a plane surface, a linear shadow caused by a corner of a polygon cross section of the case 100' does not appear on the camera as illustrated in FIG. 9, and it is possible to accurately identify information of the side surface of the gaming chip C in image analysis on a captured image of the camera.

<Use State of Inspection System>

Figure 10:
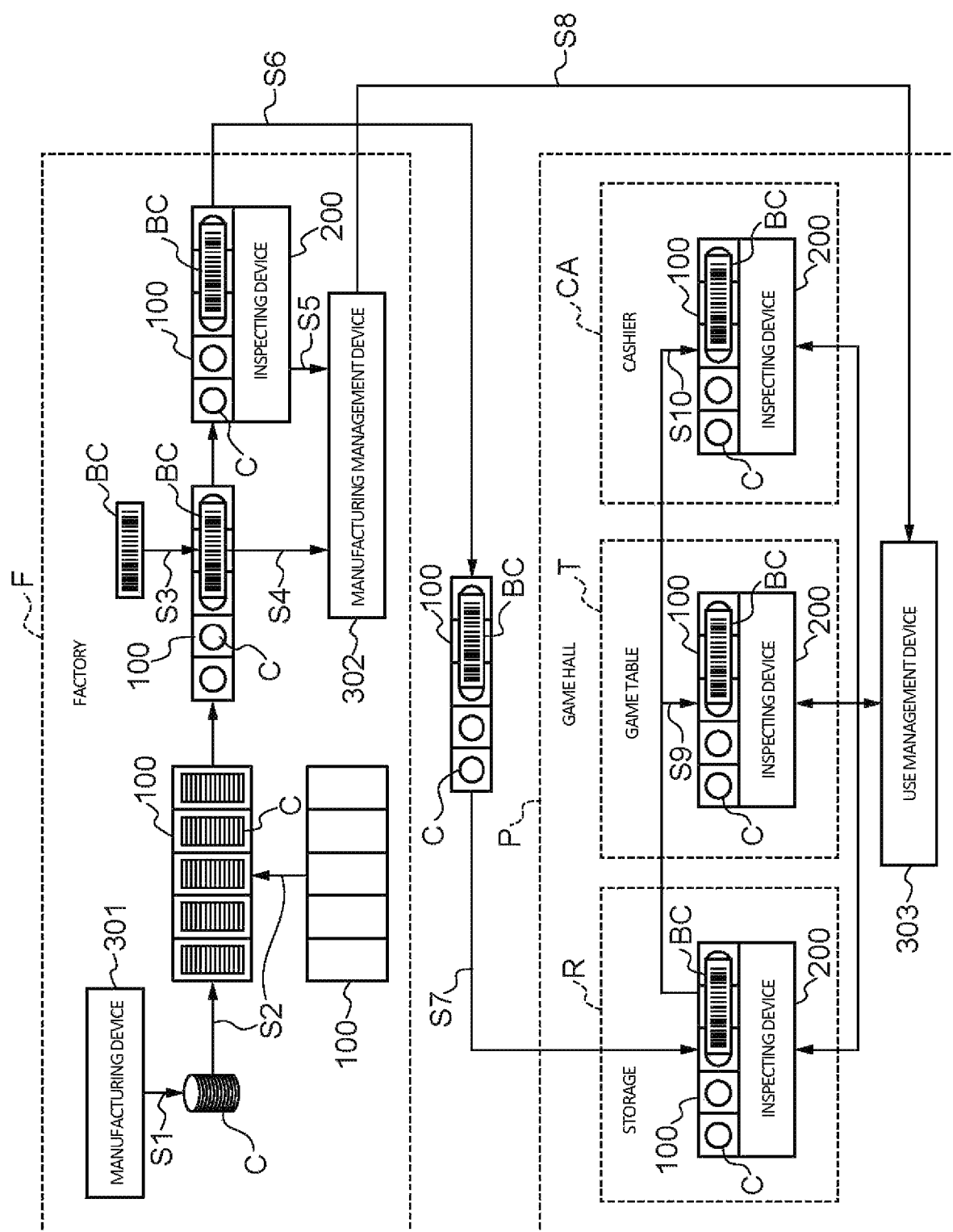
FIG. 10 is a diagram for describing an example of a use state of an inspection system together with the distribution of gaming chips in the embodiment of the present invention.

FIG. 10 is a diagram for describing an example of a use state of the inspection system 1 together with the distribution of the gaming chips C. The gaming chip C is manufactured by a manufacturing device 301 of a factory F (s1), and 100 gaming chips C are contained in the case 100 (s2). The case 100 is sealed with a seal at the factory F after the gaming chips C are contained. Further, the bar code BC indicating the case identification information uniquely specifying the case 100 is affixed to the side surface of the case 100 (s3).

At this time, the case identification information of the bar code BC affixed to the case 100 is input to the manufacturing management device 302 in the factory F (s4). Further, the case 100 containing the gaming chips C is transferred to the inspecting device 200, the gaming chip information (to be described later in detail) assigned to the gaming chip C is read, and the pass/fail inspection is performed. The gaming chip information read from the gaming chip C contained in the case 100 is transferred to the manufacturing management device 302 (s5) and associated with the case identification information through the manufacturing management device 302. The manufacturing management device 302 may be a personal computer.

The case 100 determined to be pass in the inspecting device 200 of the factory F is conveyed from the factory F to a game hall P (s6). The case 100 is first stored in a storage R in the game hall P (s7). The inspecting device 200 is installed in the storage R, and the case 100 that arrived from the factory F is inspected through the inspecting device 200.

Meanwhile, the case identification information and the gaming chip information associated with the case identification information are transmitted from the manufacturing management device 302 in the factory F to the use management device 303 in the game hall P. The use management device 303 acquires the case identification information and the gaming chip information associated with the case identification information from the manufacturing management device 302 for each of a plurality of cases 100 containing the gaming chip C and includes a storage unit that stores the acquired information for each case 100. The use management device 303 may be a personal computer.

In the inspection performed by the inspecting device 200 in the storage R, an inspection is performed using the information stored in the use management device 303. The case 100 determined to be pass in the inspection in the storage R is carried to a game table T (s9) or carried to a cashier CA (s10). Each of the game table T and the cashier CA includes the inspecting device 200, and the case 100 containing the gaming chip C is inspected by the inspecting devices 200 in a sealed state. In the game table T and the cashier CA, the case 100 containing used gaming chips C is also inspected, and the inspecting device 200 is also used for the inspection. In the inspection in the three inspecting devices 200 in the game hall P, the case identification information transmitted from the manufacturing management device 302 and stored in the use management device 303 and the gaming chip information associated with the case identification information are referred to.

<Configuration of Stored Information>

Figure 11:
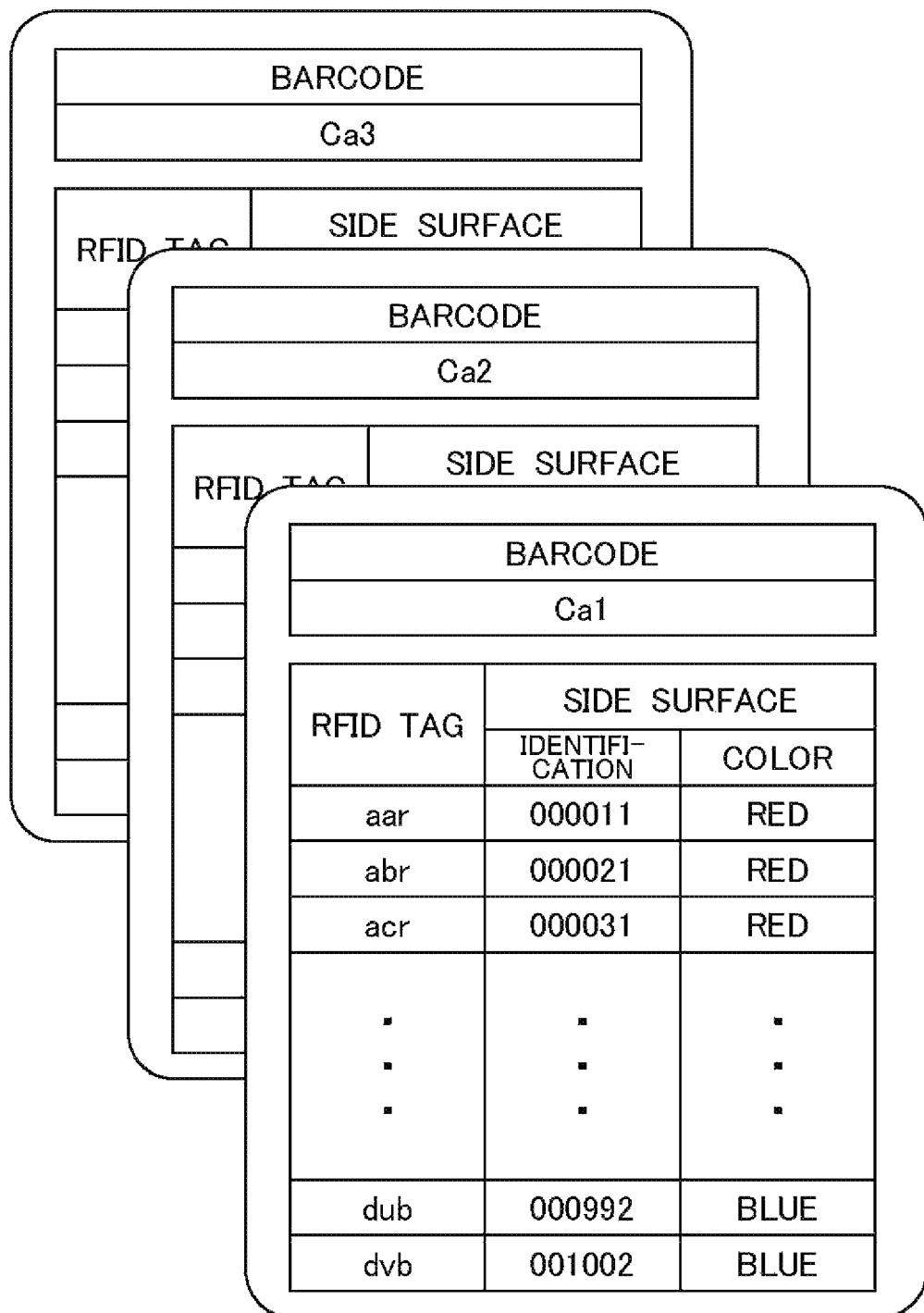
FIG. 11 is a diagram illustrating an example of content of information stored in a use management device according to the embodiment of the present invention.

FIG. 11 is a diagram illustrating an example of content of information which is generated by the manufacturing management device 302, transmitted to the use management device 303, and stored in the use management device 303. Information is generated for each case 100, and the gaming chip information of a plurality of gaming chips C (100 gaming chips in the present embodiment) contained in the case 100 is associated with each piece of case identification information (Ca1, Ca2, Ca3, . . . ).

As the gaming chip information, information including a combination of the individual identification information (aa, ab, ac, . . . , du, dv) uniquely specifying the gaming chip C and information (r, r, r, b, b) specifying the value (type) of the gaming chip C is stored in the RFID tag 503, information including a combination of individual identification information (00001, 00002, 00003, . . . , 00099, 00100) uniquely specifying the gaming chip C and information (1, 1, 1, . . . , 2, 2) specifying the value (type) of the gaming chip is stored as the notation information of the side surface, and information (red, red, red, . . . , blue, blue) specifying the value (type) of the gaming chip C is stored as the color information of the side surface.

The information stored in the RFID tag 503 is information which is electromagnetically readable by the RFID reader 221 and corresponds to first gaming chip information of the present invention, and the notation information assigned to the side surface and the color information are optically readable information and correspond to second gaming chip information of the present invention.

<Configuration of Read Information>

FIG. 12 is a diagram illustrating an example of content of information acquired from one case 100 through the bar code reader 228, the RFID reader 221, the infrared camera 225, and the visible light camera 226 in the inspecting device 200. An English character string stored in the RFID tag 503 installed in each of a plurality of gaming chips C is read out from the RFID reader 221. A numeric string which is the notation information inscribed on the side surface is read out from the infrared camera 225. Further, the color of the side surface is read out from the visible light camera 226. The identifying unit 230 analyzes (the image of) the numeric string read out from the infrared camera 225, identifies a number, specifies information including the numeric string, and specifies the designated color from the image of the side surface read out from the visible light camera 226.

Here, the notation information and the designated color information of the side surface of a plurality of gaming chips C can be acquired in accordance with an arrangement order of the gaming chips C in the case 100, but the information acquired from a plurality of RFID tags 503 is unable to be acquired in accordance with the arrangement order of the gaming chips C. In other words, it is difficult to specify a gaming chip C from which the information of the RFID tag 503 is obtained.

<Pass/Fail Determination Method>

Next, a pass/fail determination method in the computer 222 of the inspecting device 200 will be described. As described above, the identifying unit 230 specifies the gaming chip information stored in the RFID tags 503 of each of a plurality of gaming chips C contained in the case 100 on the basis of a result of reading the RFID reader 221, analyzes the infrared image obtained by the infrared camera 225, specifies the gaming chip information indicated by the notation information, analyzes the visible light image obtained by the visible light camera 226, and specifies the color of the designated color layer 501. On the basis of the information, the determining unit 231 determines the authenticity/damage of all the gaming chips contained in the case or the number of gaming chips of each value on the basis of the information, and determines whether the case 100 is pass or fail. In the following description, the gaming chip information stored in the RFID tag 503 is referred to as "first gaming chip information", and the notation information assigned to the side surface of the gaming chip C and the color information of the designated color layer 501 are referred to as "second gaming chip information".

(First Pass/Fail Determination Method)

Figure 13:
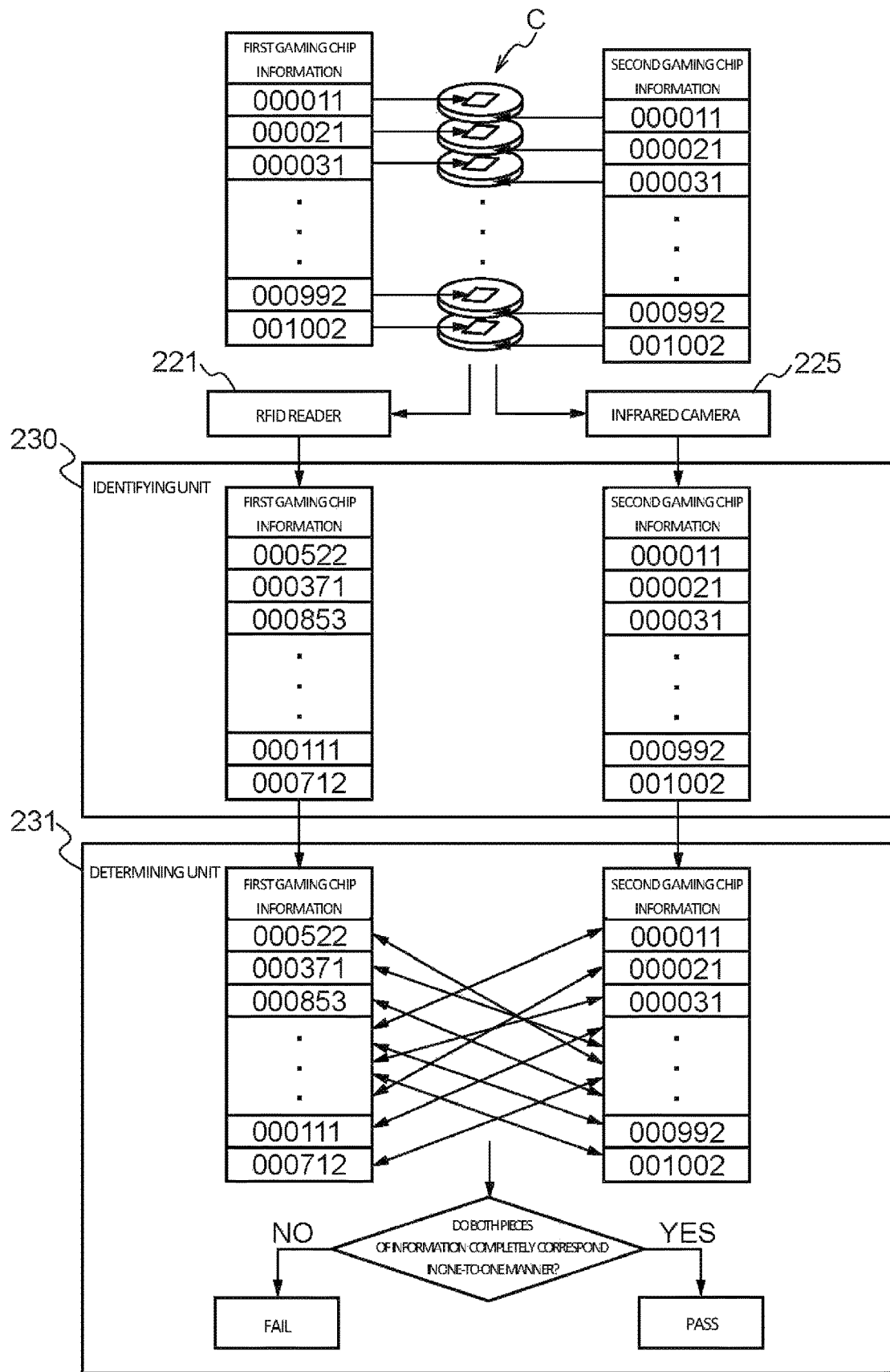
FIG. 13 is a diagram for describing a first pass/fail determination method according to the embodiment of the present invention.

In a first pass/fail determination method, the first gaming chip information and the second gaming chip information in the same gaming chip are the same information as illustrated in FIG. 13. In an example of FIG. 13, the first gaming chip information is information including the individual identification information and the value information of each gaming chip C, and the same content as the first gaming chip information is inscribed on the side surface in a form of the notation information as the second gaming chip information.

The RFID reader 221 reads the first gaming chip information from the RFID tag 503 of the gaming chip C and outputs the first gaming chip information to the identifying unit 230, the infrared camera 225 photographs the side surface of the gaming chip C, and the identifying unit 230 specifies the second gaming chip information. In this case, in the identifying unit 230, a correspondence relation between a plurality of pieces of first gaming chip information and a plurality of pieces of second gaming chip information is unclear.

The determining unit 231 compares a plurality of pieces of first gaming chip information obtained by the identifying unit 230 with a plurality of pieces of second gaming chip information, and when a plurality of pieces of first gaming chip information completely correspond to a plurality of pieces of second gaming chip information in a one-to-one manner, that is, when all pieces of first gaming chip information coincide with any one of second gaming chip information without overlapping, the determining unit 231 determines that a plurality of gaming chips C contained in the case 100 are pass, but when a plurality of pieces of first gaming chip information obtained by the identifying unit 230 do not completely coincide with a plurality of pieces of second gaming chip information, the determining unit 231 determines that a plurality of gaming chips C contained in the case 100 are fail.

As a case in which a plurality of pieces of first gaming chip information obtained by the identifying unit 230 do not completely coincide with a plurality of pieces of second gaming chip information, there is a case in which any one of the gaming chips C contained in the case 100 is a fake or a case in which the RFID tag 503 or the side surface of the gaming chip C is damaged. In other words, the determining unit 231 determines whether a plurality of gaming chips C contained in the case 100 are pass or fail by determining the authenticity/damage of all the gaming chips contained in the case 100.

(Second Pass/Fail Determination Method)

Figure 14:
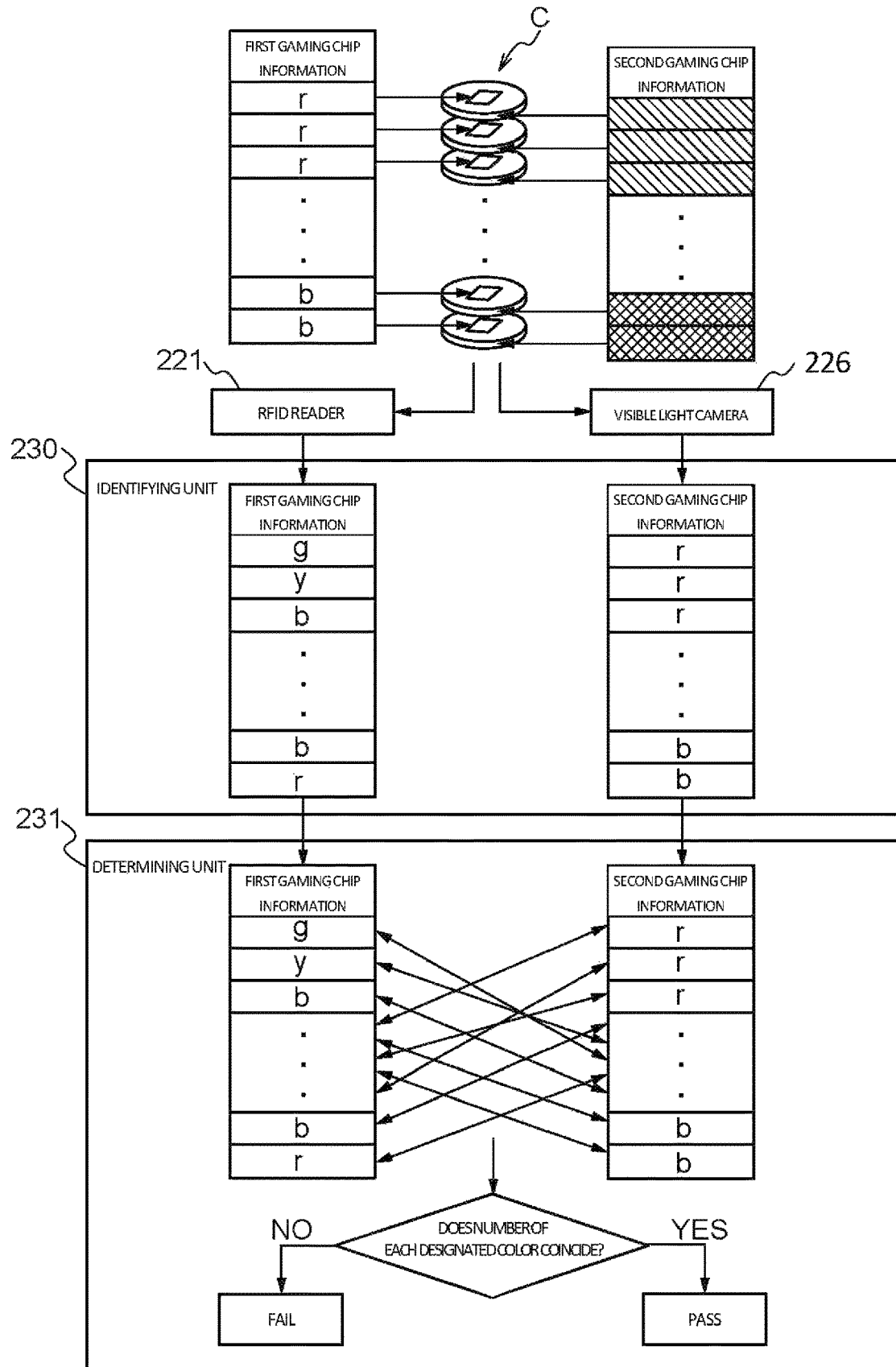
FIG. 14 is a diagram for describing a second pass/fail determination method according to the embodiment of the present invention.

In a second pass/fail determination method, the first gaming chip information and the second gaming chip information in the same gaming chip C are the same information as illustrated in FIG. 14. In an example of FIG. 14, the first gaming chip information is the value information of each gaming chip C, and in each gaming chip C, the designated color is assigned to the designated color layer 501 of the side surface as the second gaming chip information.

The RFID reader 221 reads out the first gaming chip information from the RFID tag 503 of the gaming chip C and outputs the first gaming chip information to the identifying unit 230, the visible light camera 226 photographs the side surface of the gaming chip C, and the identifying unit 230 analyzes the image and specifies the second gaming chip information (the color of the designated color layer 501).

In this case, in the identifying unit 230, a correspondence relation between a plurality of pieces of first gaming chip information and a plurality of pieces of second gaming chip information is unclear, a plurality of pieces of first gaming chip information may overlap each other, and a plurality of pieces of second gaming chip information may also overlap with each other. In the first gaming chip information and the second gaming chip information of FIG. 14, "r" indicates red, "b" indicates blue, "y" indicates yellow, and "g" indicates green.

When the number of each of all the designated colors (red, blue, yellow, and green) in a plurality of pieces of first gaming chip information obtained by the identifying unit 230 coincides with the number of each of all the designated colors (red, blue, yellow, and green) in a plurality of pieces of second gaming chip information, the determining unit 231 determines "pass", and otherwise, the determining unit 231 determines "fail".

As a case in which the number of each of all the designated colors in the first gaming chip information does not coincide with the number of each of all the designated colors in a plurality of pieces of second gaming chip information, there is a case in which any one of the gaming chips C contained in the case 100 is a fake or a case in which the side surface of any of the gaming chips C is damaged. In other words, the determining unit 231 determines whether a plurality of gaming chips C contained in the case 100 are pass or fail by determining the number of all the gaming chips C contained in the case 100 for each value.

(Third Pass/Fail Determination Method)

Figure 15:
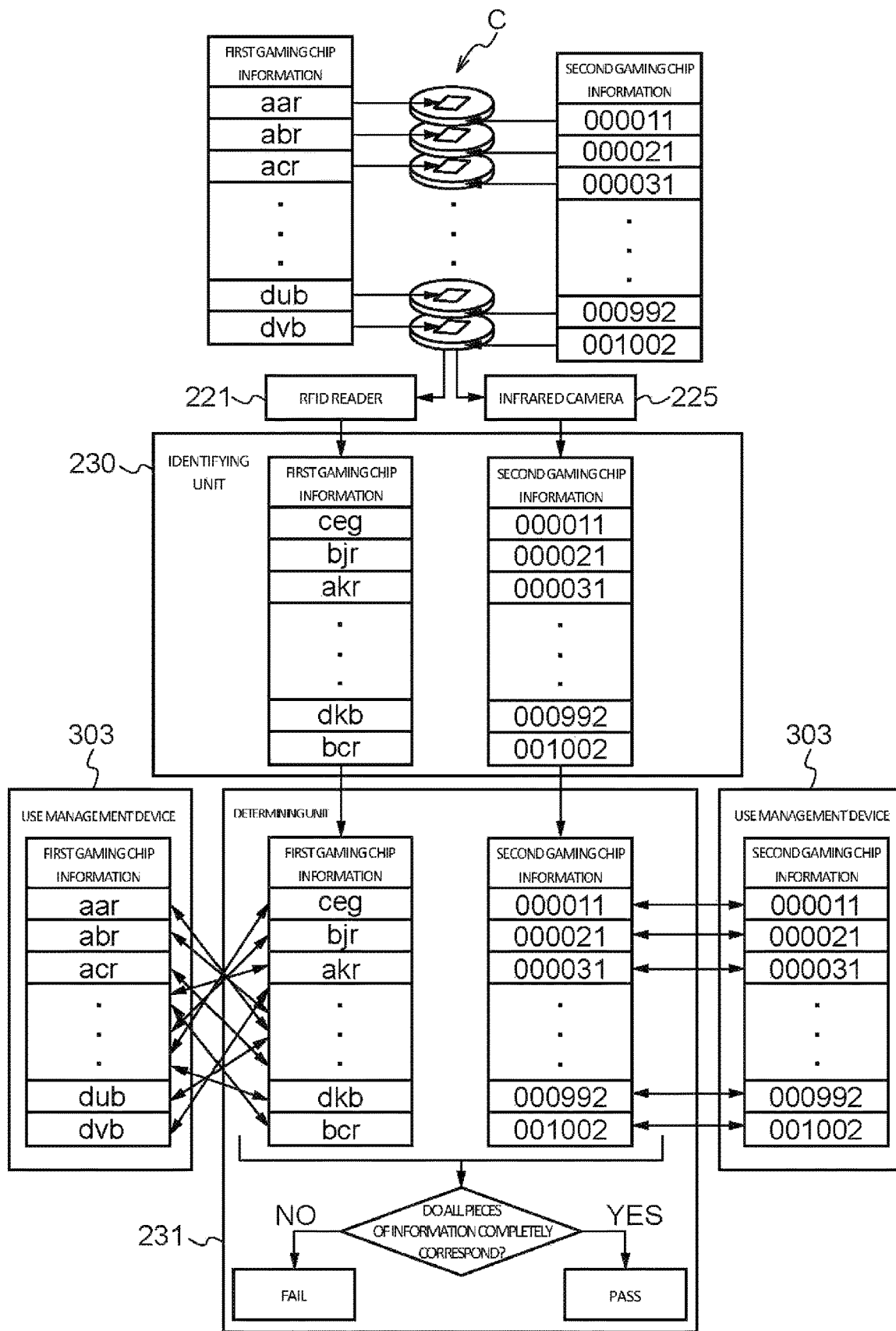
FIG. 15 is a diagram for describing a third pass/fail determination method according to the embodiment of the present invention.

In a third pass/fail determination method, the first gaming chip information and the second gaming chip information in the same gaming chip C are different information as illustrated in FIG. 15. In an example of FIG. 15, information of an English character string is stored in the RFID tag 503 of the gaming chip C as the first gaming chip information, and the notation information of a numeric string is inscribed on the side surface of the gaming chip C as the second gaming chip information.

The RFID reader 221 reads out the first gaming chip information from the RFID tag 503 of the gaming chip C and outputs the first gaming chip information to the identifying unit 230, the infrared camera 225 photographs the side surface of the gaming chip C, and the identifying unit 230 specifies the second gaming chip information. In this case, in the identifying unit 230, a correspondence relation between a plurality of pieces of first gaming chip information and a plurality of pieces of second gaming chip information is unclear.

The first gaming chip information and the second gaming chip information are stored in the use management device 303 in association with the case identification information of the case 100. The determining unit 231 compares a plurality of pieces of first gaming chip information obtained by the identifying unit 230 with a plurality of pieces of first gaming chip information associated with the case identification information of the case 100 stored in the use management device 303, and determines whether or not they completely correspond to each other in a one-to-one manner. The determining unit 231 compares a plurality of pieces of second gaming chip information obtained by the identifying unit 230 with a plurality of pieces of second gaming chip information associated with the case identification information of the case 100 stored in the use management device 303 and determines whether or not they completely correspond to each other in a one-to-one manner.

When a plurality of pieces of first gaming chip information obtained by the identifying unit 230 completely correspond to a plurality of pieces of first gaming chip information associated with the case identification information of the case 100 stored in the use management device 303 in a one-to-one manner, that is, a plurality of pieces of first gaming chip information obtained by the identifying unit 230 coincide with any one of a plurality of pieces of first gaming chip information associated with the case identification information of the case 100 stored in the use management device 303 without overlapping, and a plurality of pieces of second gaming chip information obtained by the identifying unit 230 completely correspond to a plurality of pieces of second gaming chip information associated with the case identification information of the case 100 stored in the use management device 303 in a one-to-one manner, that is, a plurality of pieces of second gaming chip information obtained by the identifying unit 230 coincide with any one of a plurality of pieces of second gaming chip information associated with the case identification information of the case 100 stored in the use management device 303 without overlapping, the determining unit 231 determines that a plurality of gaming chips C contained in the case 100 are pass, and when any one of a plurality of pieces of first gaming chip information does not coincide or any one of a plurality of pieces of second gaming chip information does not coincide, the determining unit 231 determines that a plurality of gaming chips C contained in the case 100 are fail.

As a case in which one of a plurality of pieces of first gaming chip information does not coincide with the stored information or one of a plurality of pieces of second gaming chip information does not coincide with the stored information, there is a case in which any one of gaming chips C contained in the case 100 is a fake or a case in which the RFID tag 503 or the side surface of the gaming chip C is damaged. In other words, the determining unit 231 determines whether or not a plurality of gaming chips C contained in the case 100 are pass or fail by determining the authenticity/damage of all the gaming chips C contained in the case 100.

(Fourth Pass/Fail Determination Method)

Figure 16:
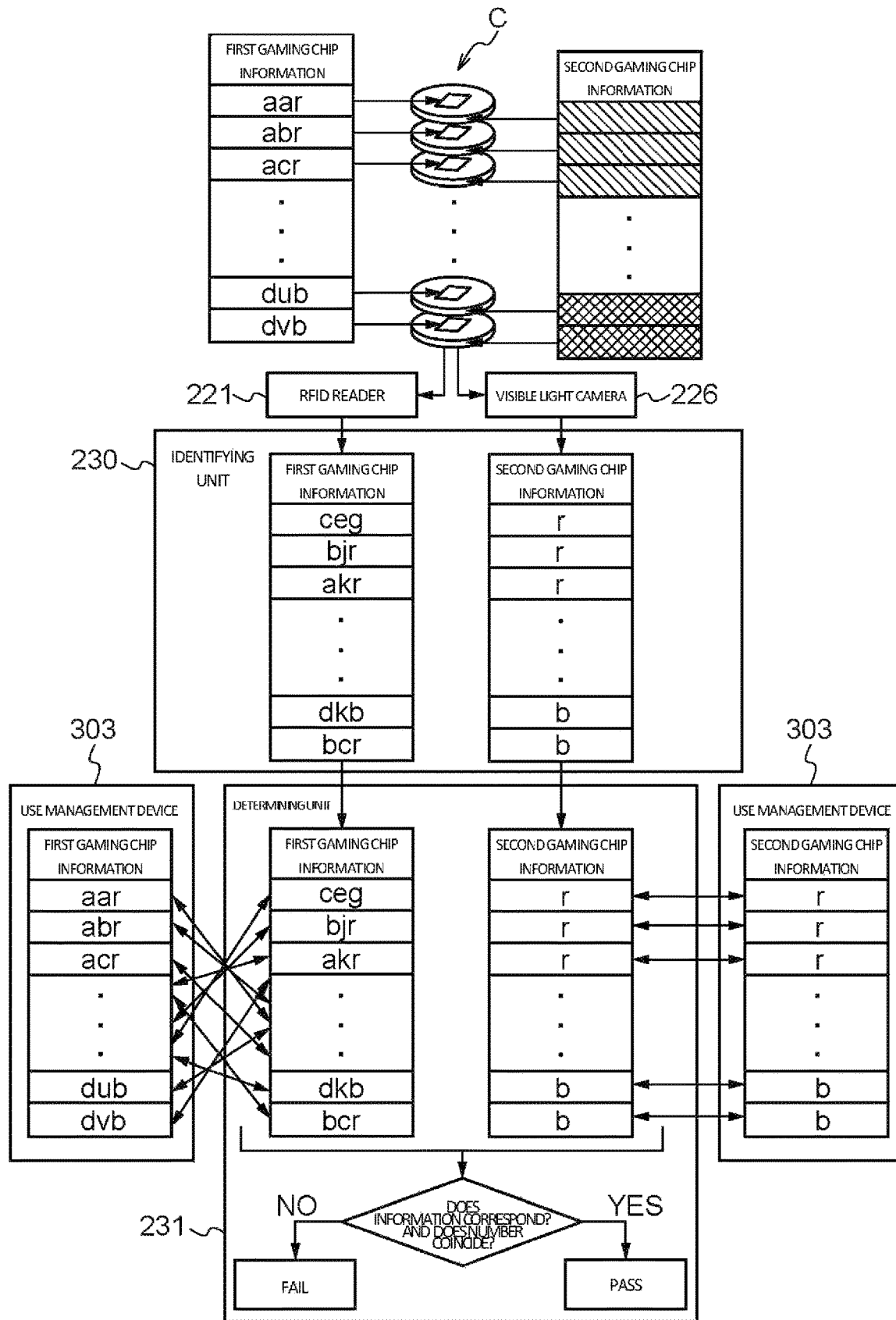
FIG. 16 is a diagram for describing a fourth pass/fail determination method according to the embodiment of the present invention.

In a fourth pass/fail determination method, the first gaming chip information and the second gaming chip information in the same gaming chip C are different information as illustrated in FIG. 16. In an example of FIG. 16, information of an English character string is stored in the RFID tag 503 of the gaming chip C as the first gaming chip information, and the designated color layer 501 of the side surface of the gaming chip C is colored in the designated color corresponding to the value as the second gaming chip information.

The RFID reader 221 reads out the first gaming chip information from the RFID tag 503 of the gaming chip C and outputs the first gaming chip information to the identifying unit 230, the visible light camera 226 photographs the side surface of the gaming chip C and outputs a captured image to the identifying unit 230, and the identifying unit 230 analyzes the captured image and specifies the designated color which is the second gaming chip information. In this case, in the identifying unit 230, a correspondence relation between a plurality of pieces of first gaming chip information and a plurality of pieces of second gaming chip information is unclear.

The first gaming chip information and the second gaming chip information are stored in the use management device 303 in association with the case identification information of the case 100. The determining unit 231 compares a plurality of pieces of first gaming chip information obtained by the identifying unit 230 with a plurality of pieces of first gaming chip information associated with the case identification information of the case 100 stored in the use management device 303 and determines whether or not they completely correspond to each other in a one-to-one manner. The determining unit 231 compares the number of each designated color in a plurality of pieces of second gaming chip information obtained by the identifying unit 230 with the number of each designated color in a plurality of pieces of second gaming chip information associated with the case identification information of the case 100 stored in the use management device 303, and determines whether or not the numbers of designated colors coincide with each other.

When a plurality of pieces of first gaming chip information obtained by the identifying unit 230 completely correspond to a plurality of pieces of first gaming chip information associated with the case identification information of the case 100 stored in the use management device 303, and the number of each of all the designated colors in a plurality of pieces of second gaming chip information obtained by the identifying unit 230 coincide with the number of each of all the designated colors in a plurality of pieces of second gaming chip information associated with the case identification information of the case 100 stored in the use management device 303, the determining unit 231 determines the case 100 to be "pass", and when any one of a plurality of pieces of first gaming chip information does not coincide, and the number of any one of the designated colors in a plurality of pieces of second gaming chip information does not coincide, the determining unit 231 determines the plurality of gaming chips C contained in the case 100 to be "fail".

As a case in which one of a plurality of pieces of first gaming chip information does not coincide with the stored information or the number of any of the designated colors in a plurality of pieces of second gaming chip information does not coincide, there is a case in which any one of gaming chips C contained in the case 100 is a fake or a case in which the RFID tag 503 or the side surface of the gaming chip C is damaged. In other words, the determining unit 231 determines whether or not a plurality of gaming chips C contained in the case 100 are pass or fail by determining the authenticity/damage of all the gaming chips C contained in the case 100 and the number of gaming chips C for each value.

(Fifth Pass/Fail Determination Method)

Figure 17:
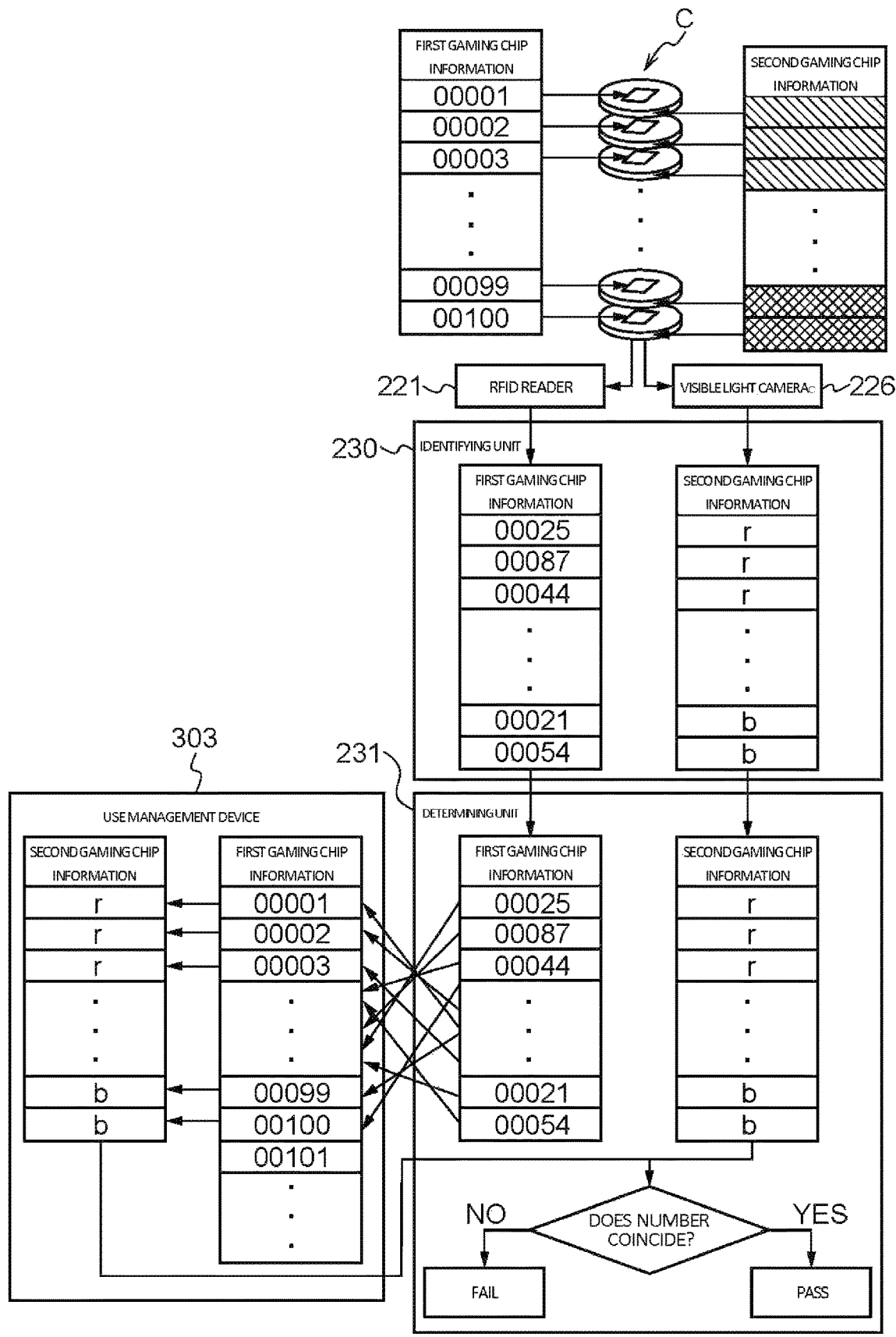
FIG. 17 is a diagram for describing a fifth pass/fail determination method according to the embodiment of the present invention.

In a fifth pass/fail determination method, the first gaming chip information and the second gaming chip information in the same gaming chip C are different information as illustrated in FIG. 17. In an example of FIG. 17, the individual identification information including a numeric string is stored in the RFID tag 503 of the gaming chip C as the first gaming chip information, and the value information of the gaming chip C is assigned to the side surface of the gaming chip C as the second gaming chip information in the form of the designated color of the designated color layer 501.

The RFID reader 221 reads out the first gaming chip information from the RFID tag 503 of the gaming chip C and outputs the first gaming chip information to the identifying unit 230, the visible light camera 226 photographs the side surface of the gaming chip C and outputs a captured image to the identifying unit 230, and the identifying unit 230 analyzes the captured image and specifies the designated color which is the second gaming chip information. In this case, in the identifying unit 230, a correspondence relation between a plurality of pieces of first gaming chip information and a plurality of pieces of second gaming chip information is unclear.

The correspondence relation between the first gaming chip information and the second gaming chip information is stored in the use management device 303. In an example of FIG. 17, the individual identification information uniquely specifying the gaming chip C is associated with the designated color of the designated color layer 501 of the side surface, that is, the value information of the gaming chip C, and it is possible to understand the value of the gaming chip C when the individual identification information is designated. In the case of the present example, the use management device 303 need not store a combination of the first gaming chip information and the second gaming chip information for each piece of case identification information. In other words, in the present example, the gaming chips C contained in case 100 can be inspected without using the case identification information.

The determining unit 231 specifies the first gaming chip information corresponding to the first gaming chip information identified by the identifying unit 230 from the first gaming chip information stored in the use management device 303 and specifies the second gaming chip information associated with the first gaming chip information, that is, the value. The determining unit 231 can obtain the number of each value in a plurality of pieces of second gaming chip information extracted from the use management device 303 for one case by performing the above process on all pieces of the first gaming chip information identified by the identifying unit 230.

The determining unit 231 compares the number of each value obtained as described above with the number of each value in the second gaming chip information identified for the case 100 from the identifying unit 230. When the numbers of each of all the values coincide, the determining unit 231 determines that a plurality of gaming chips C contained in the case 100 are pass, and when the number of any one of the values does not coincide, the determining unit 231 determines that a plurality of gaming chips C contained in the case 100 are fail.

As a case in which the number of each value in a plurality of pieces of second gaming chip information extracted from the use management device 303 does not coincide with the number of each value in the second gaming chip information identified for the case 100 from the identifying unit 230, there is a case in which any one of gaming chips C contained in the case 100 is a fake or a case in which the RFID tag 503 or the side surface of the gaming chip C is damaged. In other words, the determining unit 231 determines whether or not a plurality of gaming chips C contained in the case 100 are pass or fail by determining the authenticity/damage of all the gaming chips C contained in the case 100 and the number of gaming chips C for each value.

Although not illustrated, even when the value of the gaming chip C is stored as the first gaming chip information, and the individual identification information of the gaming chip C is stored as the second gaming chip information, the pass/fail determination can be performed similarly to the above example.

The first to fifth pass/fail determination methods have been described above, but the determining unit 231 may employ a combination of the above pass/fail determination methods. In addition to the above pass/fail determination methods, when both the number of pieces of first gaming chip information and the number of pieces of second gaming chip information read from a plurality of gaming chips C contained in the case 100 are not a predetermined number (100 in the present embodiment), the determining unit 231 may determine that a plurality of gaming chips C contained in the case 100 are fail.

The first and second pass/fail determination methods are pass/fail determination methods that can be executed without using the information stored in the use management device 303 installed in the game hall P and suitable when executed by the inspecting device 200 in the factory F, the third to fifth pass/fail determination methods are pass/fail determination methods using the information stored in the use management device 303 installed in the game hall P and suitable when executed by the inspecting device 200 in the game hall P, but the inspecting device 200 in the game hall P may employ the first or second pass/fail determination method. When all the inspecting devices 200 in the game hall P employ the pass/fail determination method in which the information stored in the use management device 303 is not used such as the first or second pass/fail determination method, the use management device 303 may be omitted.

Further, the inspecting device 200 in the game hall P also inspects the case 100 containing the used gaming chips C, but in the case, the first, second, or fifth pass/fail determination method in which information of the gaming chips to be contained in the case need not be stored may be employed.

Further, in the above embodiment, the gaming chip C includes the individual identification information and/or the value information as the first gaming chip information and/or the second gaming chip information. Here, the individual identification information is information uniquely specifying each gaming chip C, whereas the value information is information that can overlap each other in a plurality of gaming chips C and can be regarded as information (group information) indicating a group to which each gaming chip belongs. In the present embodiment, as the group information of the associated group, instead of the value or in addition to the value, for example, information of a gaming chip manufacturing time, a manufacturer, and/or a game hall in which a gaming chip is used may be employed.

In other words, both the first gaming chip information and the second gaming chip information may include the individual identification information identifying the gaming chip, the first gaming chip information and the second gaming chip information may include the group information indicating the group to which the gaming chip belongs, the first gaming chip information may include the individual identification information identifying the gaming chip, and the second gaming chip information may include the group information of the group to which the gaming chip belongs, or, the first gaming chip information may include the group information of the group to which the gaming chip belongs, and the second gaming chip information may include the individual identification information identifying the gaming chip.

<Pass/Fail Determination Result Display>

Figure 18:
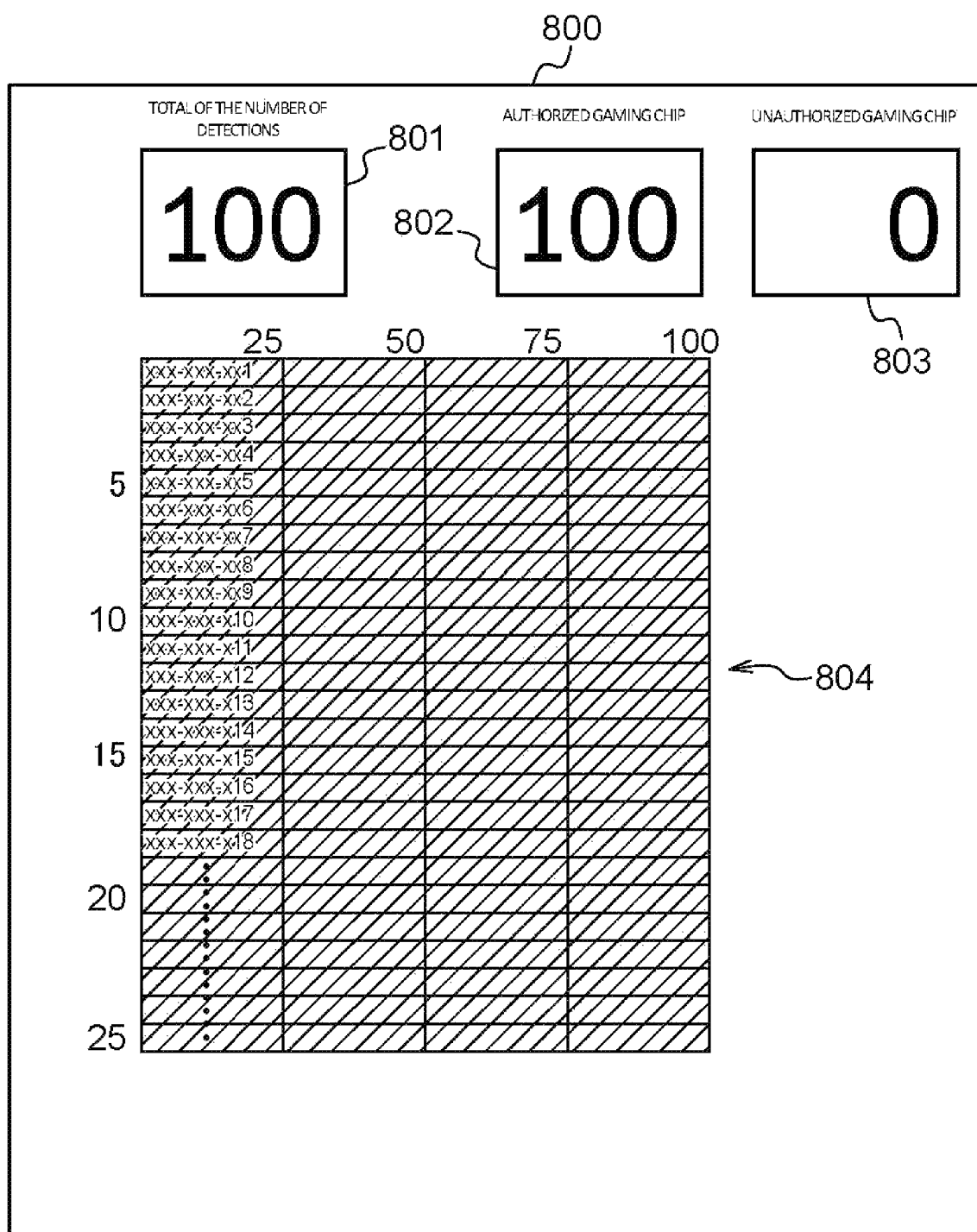
FIG. 18 is a diagram illustrating an example of a pass/fail result display screen illustrating a pass/fail determination result (pass) according to the embodiment of the present invention.
Figure 19:
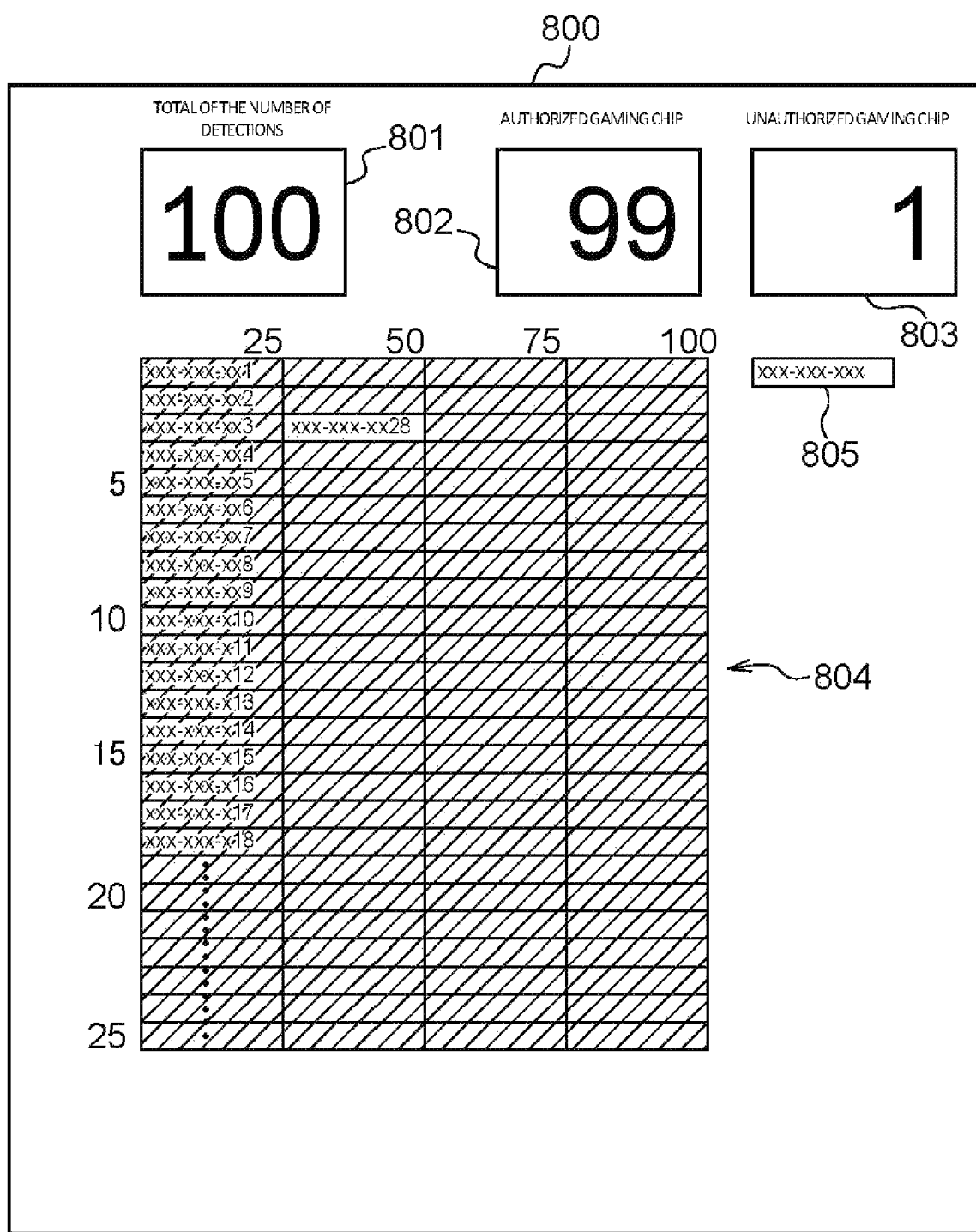
FIG. 19 is a diagram illustrating an example of a pass/fail result display screen illustrating a pass/fail determination result (fail) according to the embodiment of the present invention.

FIGS. 18 and 19 are diagrams illustrating an example of a pass/fail determination result display screen illustrating a pass/fail determination result in the determining unit 231. These pass/fail result display screens are generated by the computer 222 on the basis of the pass/fail determination result in the determining unit 231 and displayed on the display unit 223. FIG. 18 illustrates an example of a display screen in the case of "pass", and FIG. 19 illustrates an example of a display screen in the case of "fail".

As illustrated in FIGS. 18 and 19, a pass/fail result display screen 800 includes a total of the number of detections 801 which is the number of combinations of the first gaming chip information and the second gaming chip information read out from the gaming chip C by the identifying unit 230, the number of authorized gaming chips C 802, and the number of unauthorized gaming chips C 803.

The computer 222 sets a larger one of the number of pieces of first gaming chip information and the number of pieces of second gaming chip information as the total of the number of detections 801. For example, when 100 gaming chips C are contained in the case 100, and one of the 100 gaming chips C has no RFID tag 503 therein, the identifying unit 230 specifies 100 pieces of second gaming chip information from a plurality of gaming chips C but obtains only 99 pieces of first gaming chip information. In this case, the computer 222 sets 100 which is the larger of the first gaming chip information and the second gaming chip information as the total of the number of detections 801.

In the case of the first or second pass/fail determination method, the computer 222 decides the number of combinations of the first gaming chip information and the second gaming chip information that are determined to coincide with each other as the number of authorized gaming chips C 802, and decides a number obtained by subtracting the number of authorized gaming chips C from the total of the number of detections 801 as the number of unauthorized gaming chips C 803.

In the case of the third or fourth pass/fail determination method, the computer 222 decides a smaller one of the number of pieces of first gaming chip information in which the correspondence relation with the first gaming chip information stored in the use management device 303 has been confirmed and the number of pieces of second gaming chip information in which the correspondence relation with the second gaming chip information stored in the use management device 303 has been confirmed as the number of authorized gaming chips C 802, and decides a number obtained by subtracting the number of authorized gaming chips C from the total of the number of detections 801 as the number of unauthorized gaming chips C 803.

In the case of the fifth pass/fail determination method, the computer 222 decides the number of pieces of second gaming chip information in which the correspondence relation with the second gaming chip information stored in the use management device 303 has been confirmed as the number of authorized gaming chips C 802, and decides a number obtained by subtracting the number of authorized gaming chips C from the total of the number of detections 801 as the number of unauthorized gaming chips C 803.

The pass/fail result display screen 800 includes a gaming chip information display portion 804 that displays the gaming chip information read out from the gaming chip C through the identifying unit 230. In the gaming chip information display portion 804, when the gaming chip information stored in the use management device 303 is read or when the first gaming chip information coincides with the second gaming chip information, the gaming chip information is colored and displayed, and the gaming chip information which is stored in the use management device 303 but not read out is displayed in white (see FIG. 19).

In the pass/fail result display screen 800, when the gaming chip information not stored in the use management device 303 is read or when the first gaming chip information does not coincide with the second gaming chip information, the gaming chip information is displayed outside the gaming chip information display portion 804 as unauthorized gaming chip information 805.

<Modified Example>
(RFID Antenna of Inspecting Device)

Figure 20:
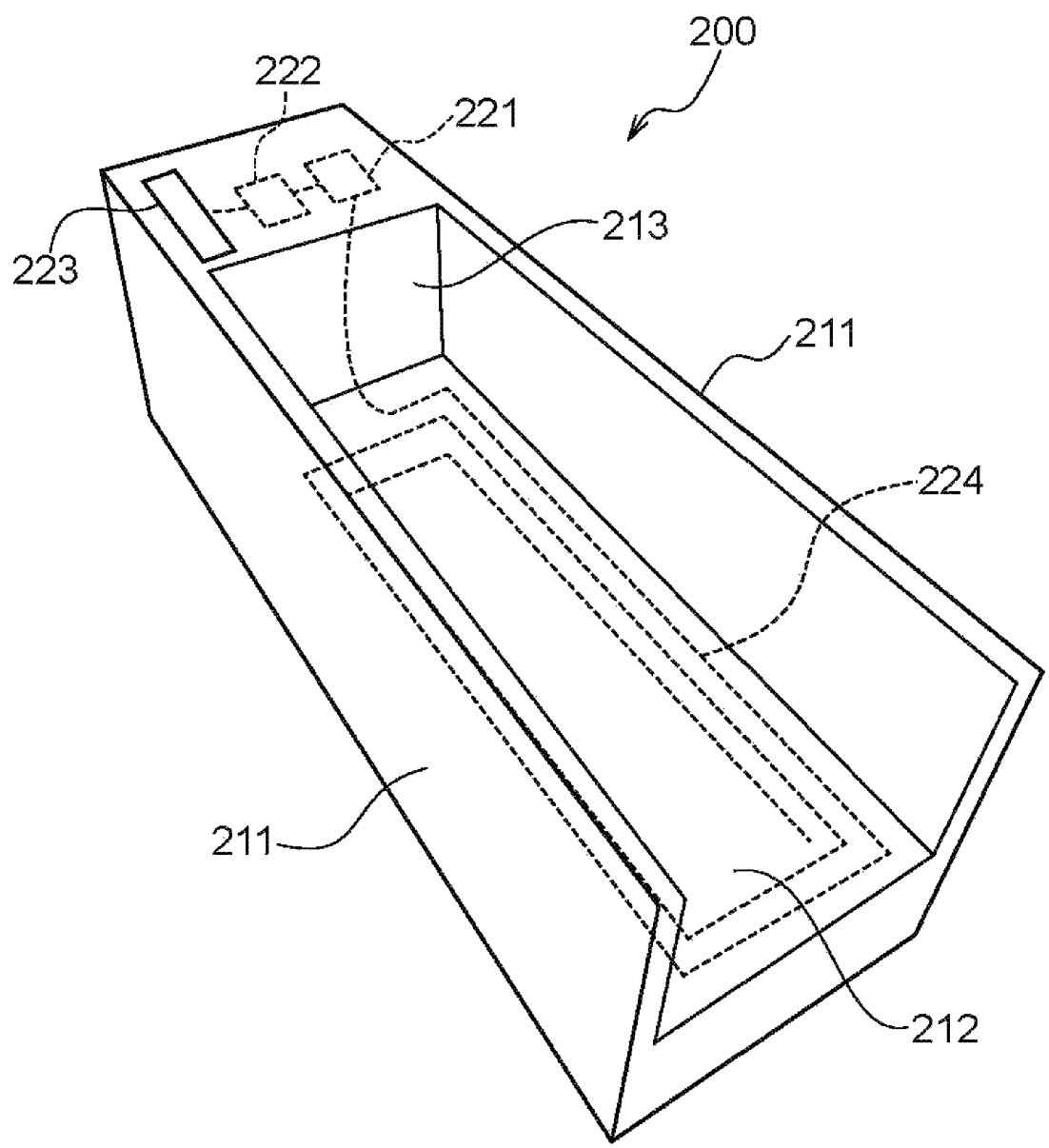
FIG. 20 is a diagram illustrating a modified example of an RFID antenna of the inspecting device according to the embodiment of the present invention.

FIG. 20 is a diagram illustrating an RFID antenna 224 of the inspecting device 200 according to a modified example. In FIG. 20, the arm 227, the infrared camera 225, and the visible light camera 226 are not illustrated. In the above embodiment, the RFID antenna 224 is installed in the left and right sidewalls 211, but the RFID antenna 224 may be installed in an inner wall 213. In this case, the RFID antenna 224 is arranged in a spiral shape inside the inner wall 213.

(Gaming Chip)

Figure 21:
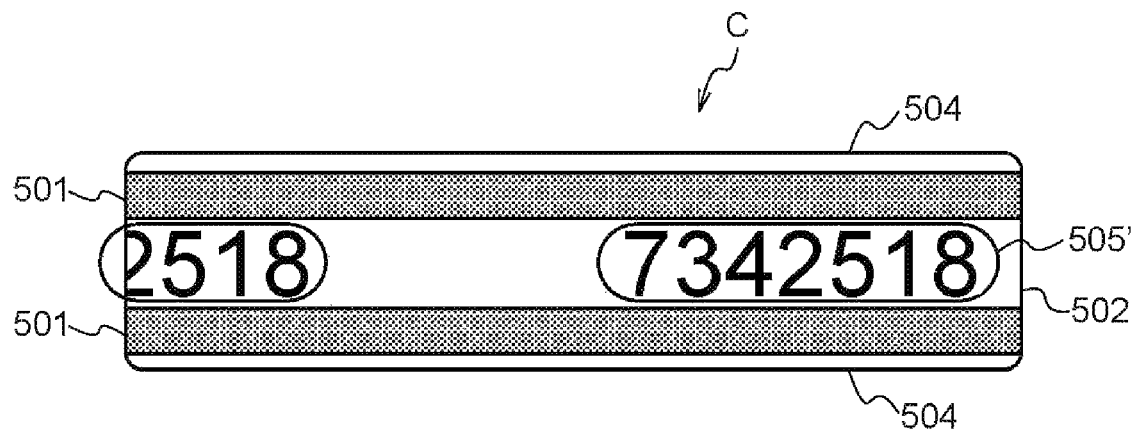
FIG. 21 is a side view of a gaming chip according to a modified example of the embodiment of the present invention.

FIG. 21 is a side view of a gaming chip C' according to a modified example. In the gaming chip C of the above embodiment, the designated color layer 501 is sandwiched between the common color layers 502, but in the example of FIG. 21, in the gaming chip C', a common color layer 502 is formed as the center, and the designated color layer 501 is formed as both (upper and lower) sides. In the example of FIG. 21, individual identification information indicated by a 7-digit numeric string is inscribed (printed) on the side surface of the gaming chip C' as code information 505'. In the example of FIG. 21, the code information 505' serving as the notation information is inscribed on the common color layer 502 in the middle. In this case, the code information 505' can indicate 10-th power of 7 types of information.

Further, both the code information 505 indicated by the presence/absence of the mark m described for the gaming chip C of the above embodiment and the code information 505' of the numeric string illustrated in FIG. 21 are inscribed on the side surface of the gaming chip C. In this case, the code information 505 of the mark m and the code information 505' of the numeric string may be printed with different types of ink. For example, the code information 505 of the mark m may be printed with the infrared reaction ink, and the code information 505' of the numeric string may be printed with the UV reactive ink. In this case, an infrared camera and an ultraviolet camera may be prepared to photograph the side surface of the gaming chip C, the code information 505 of the mark m may be read by the infrared camera, and the code information 505' of the numeric string may be read by the ultraviolet camera.

Figure 22:
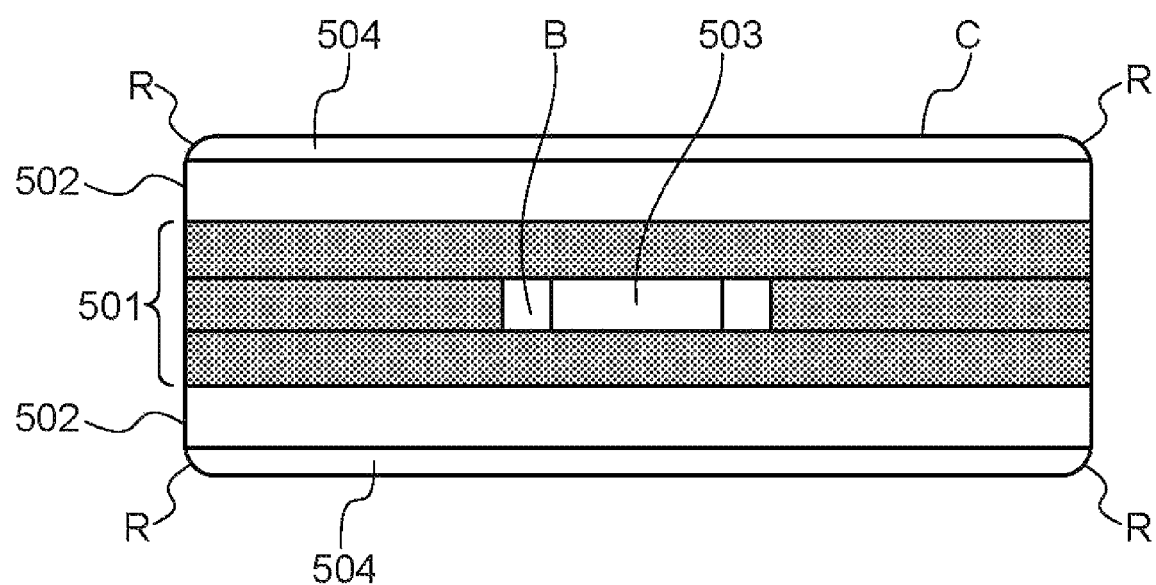
FIG. 22 is a side sectional view of a gaming chip according to a modified example in the embodiment of the present invention.

FIG. 22 is a side sectional view of the gaming chip C" according to another modified example. The gaming chip C" has a multi-layer structure in which a plurality of plastic layers having different colors are stacked, a designated color layer 501 (a colored layer) is arranged at least in the middle, and a common color layer (a white or light-colored layer) 502 are stacked on both sides of the designated color layer 501 in the middle. It is desirable that the color of the common color layer 502 be thinner than the color of the designated color layer 501. Since the gaming chip C" has a multi-layer structure in which the designated color layer 501 is arranged, and the common color layer 502 is stacked on both sides of the designated color layer 501 in the middle as described above, it is possible to specify a type of gaming chip C" (10 points, 20 points, 100 points, 1,000 points, or the like) by forming a stripe pattern on the side surface in a stack direction and changing the color of the designated color layer 501 (red, green, yellow, blue, or the like) as illustrated in FIG. 23.

Figure 23:
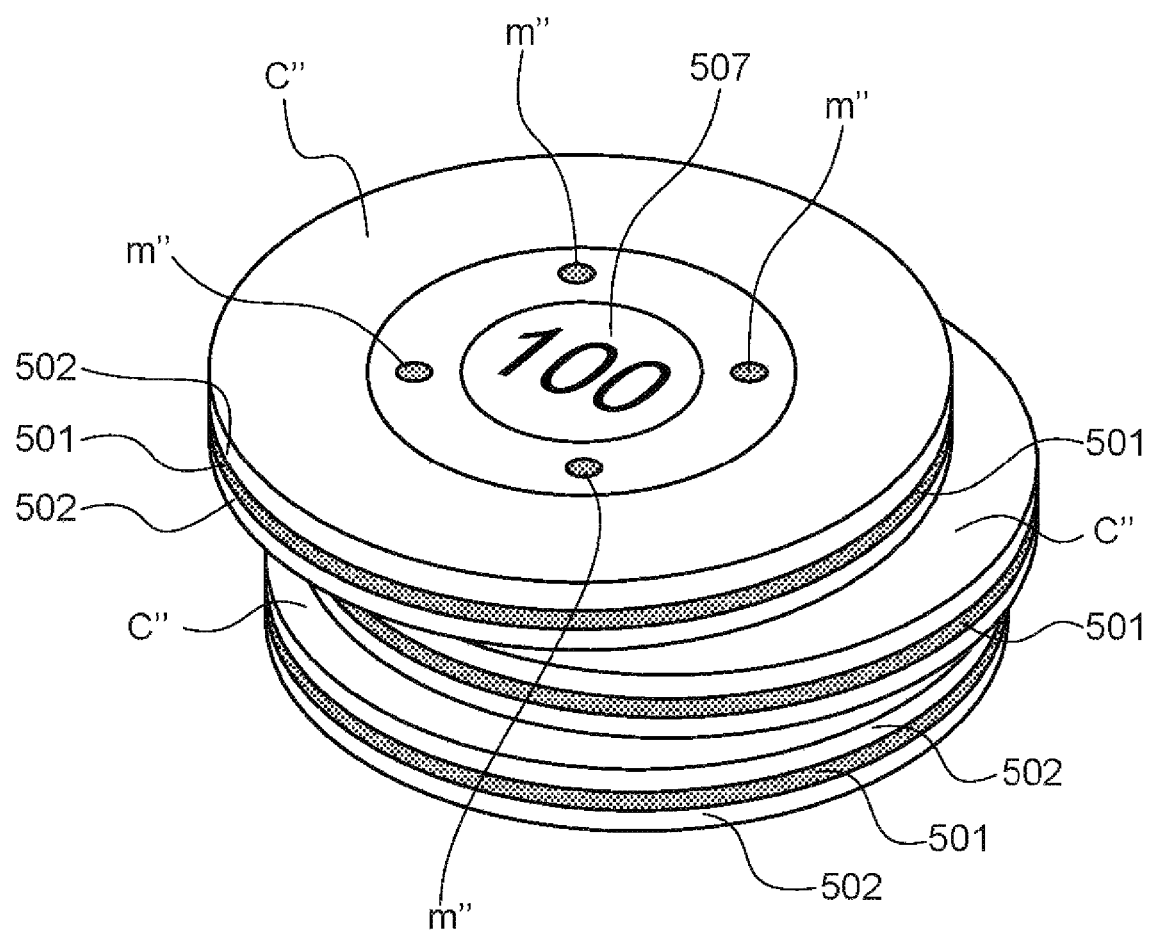
FIG. 23 is a perspective view of a gaming chip according to a modified example of the embodiment of the present invention.
Figure 24:
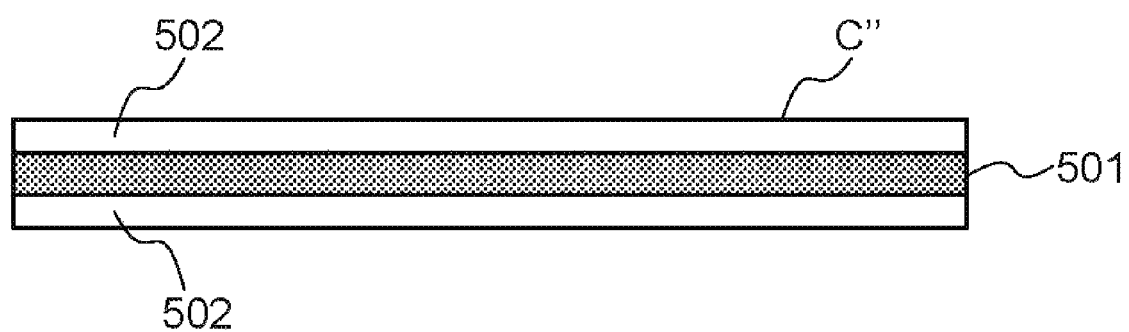
FIG. 24 is a side view of a gaming chip according to a modified example of the embodiment of the present invention.
Figure 25:
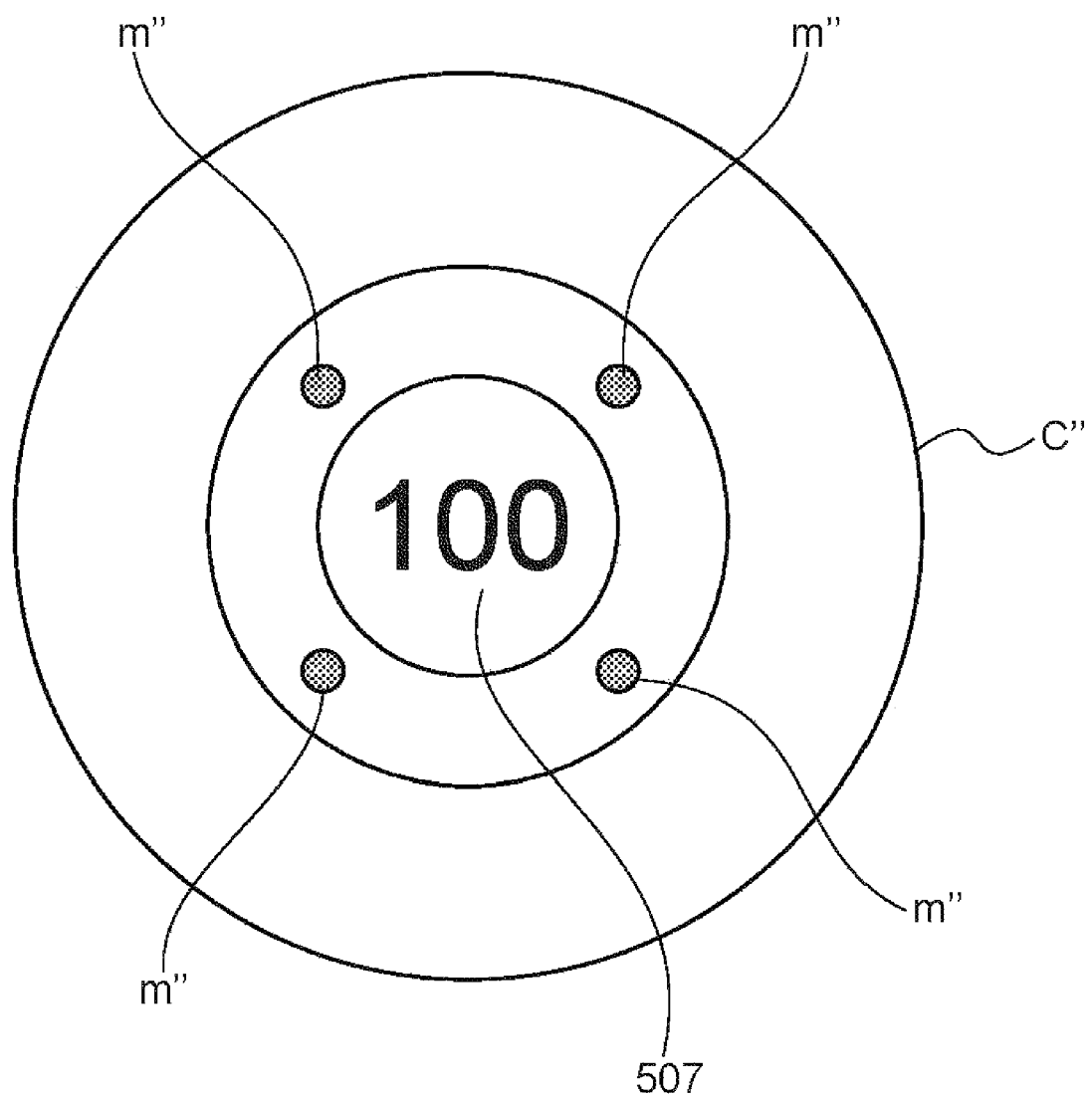
FIG. 25 is a plan view of a gaming chip according to a modified example of the embodiment of the present invention.

FIG. 23 is a perspective view of stacked gaming chips C", FIG. 24 is a side view of the gaming chip C", and FIG. 25 is a plan view of the gaming chip C". As illustrated in FIG. 23, the gaming chip C" has a five or more-layer structure in which a print 507 (100 points or the like) indicating a type (value) of gaming chip C" is performed on the surface (the upper surface and the lower surface) of the common color layer 502, a transparent layer 504 is formed as the outermost layer, and the respective layers are thermocompression-bonded. The gaming chip C" is formed using an elongated plastic material such that a state in which the respective layers (the designated color layer 501, the common color layer 502, and the transparent layer 504) are thermocompression-bonded and adhered to each other in an elongated stated (a five-layer structure or the like) is formed and then punched out into a circular shape, a rectangular shape, or the like through a process or the like. When the punching is performed through the press, dimensions of a die and a punch of a mold for punching are designed, and R treatment (rounded corner) is applied to the end of the transparent layer 504 of the outermost layer.

Further, in the gaming chip C", the mark m" is formed on the surface of common color layer 502 using the UV ink or the carbon black ink. The mark m" indicates whether the gaming chip C" is true or false, and the mark m" becomes visible when irradiated with ultraviolet rays (or infrared rays), and it is indicated whether the gaming chip C" is true or false in accordance with a combination of shapes of the mark m" and the number of marks m". The transparent layer 504 is thermocompression bonded or applied on the outermost layer so as to cover the print 507 or the mark m', but embossing treatment is applied to the transparent layer 504, and thus the gaming chips C" are prevented from adhering to each other.

The R treatment (R) is performed on the end of the transparent layer 504 of the outermost layer which has undergone a print 507 (100 points or the like), and the surface of the common color layer 502 is prevented from being deformed in the process of punching the gaming chip C" and appearing on the side surface. Further, a sharp edge of the gaming chip C" is prevented from remaining and damaging a hand and other gaming chips C".

As illustrated in FIG. 22, the designated color layer 501 may be formed by a plurality of layers colored in the designated color (three layers in FIG. 22). Since a plurality of layers colored in the designated color (three layers in FIG. 22) are thermocompression bonded to each other, the three-layer structure is not visible as illustrated in FIG. 22, and FIG. 22 illustrates the three layers of the designated color layer 501 for the sake of description. Further, a partial hollow B is formed in a middle layer among the three layers of the designated color layer 501, and a RFID tag 503 is installed in the partial hollow B.

Figure 26:
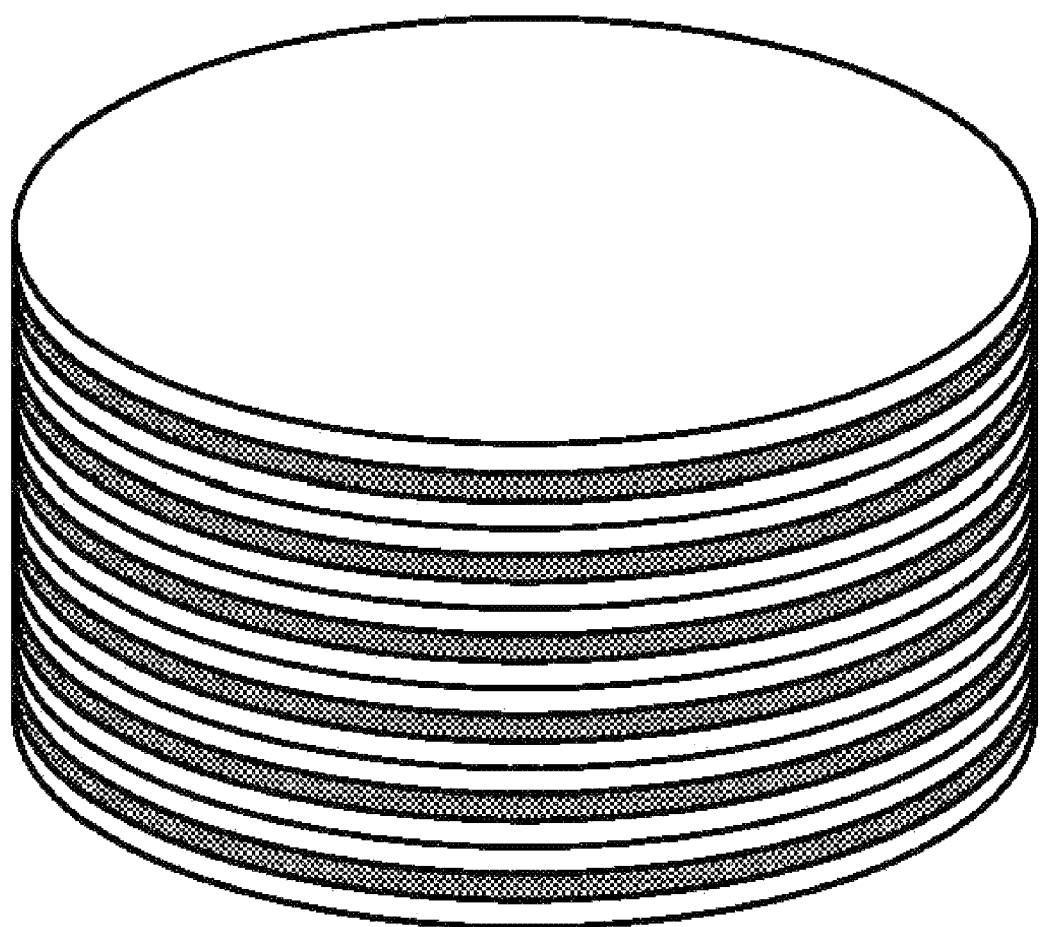
FIG. 26 is a diagram illustrating an example of an image obtained by photographing stacked gaming chips in the embodiment of the present invention.

Since the gaming chip C, C', and C" have a stacked multi-layer structure, and a stripe pattern in the lamination direction is vividly formed on the side surface as illustrated in FIG. 2, FIG. 21, and FIG. 22, it is possible to easily and accurately measure the color of the designated color layer 501 (the type of gaming chip) and the number of designated color layers 501 through image analysis as compared with a chip of a related art. FIG. 26 is a diagram illustrating an example of an image obtained by photographing the stacked gaming chips. As illustrated in FIG. 26, it is possible to photograph the side surface of the gaming chip C through the visible light camera 226 and clearly identify the designated color layer 501. Further, it is possible to accurately analyze and determine an image when an artificial intelligence utilization type computer or control system or a deep learning (structure) technique is used in the image analysis. Since the artificial intelligence utilization type computer or control system or the deep learning (structure) technique is known to those skilled in the art, detailed description thereof is omitted.

(Detection of Seal)

As described above, the case 100 is sealed with a seal after a predetermined number of gaming chips C are contained. The seal is broken when the case is opened to allow the contained gaming chips to be withdrawn. The inspecting device 200 may include a detecting unit that detects an unbroken seal affixed to the case 100. The detecting unit may detect the seal optically or magnetically. In this case, when an unbroken seal is not detected by the detecting unit, the determining unit 231 determines that a plurality of gaming chips C contained in the case 100 are fail.

(Arrangement of Components of Inspecting Device)

In the above embodiment, all the components of the inspecting device 200 are arranged in a single device as illustrated in FIG. 6, but the components may be distributedly arranged. For example, some or all of the computer 222, the display unit 223, and the communication unit 229 may be implemented by a personal computer connected to the inspecting device 200. The distributedly arranged components may be connected to be able to perform wired or wireless communication or may be connected via a network such as the Internet.

Figure 27:
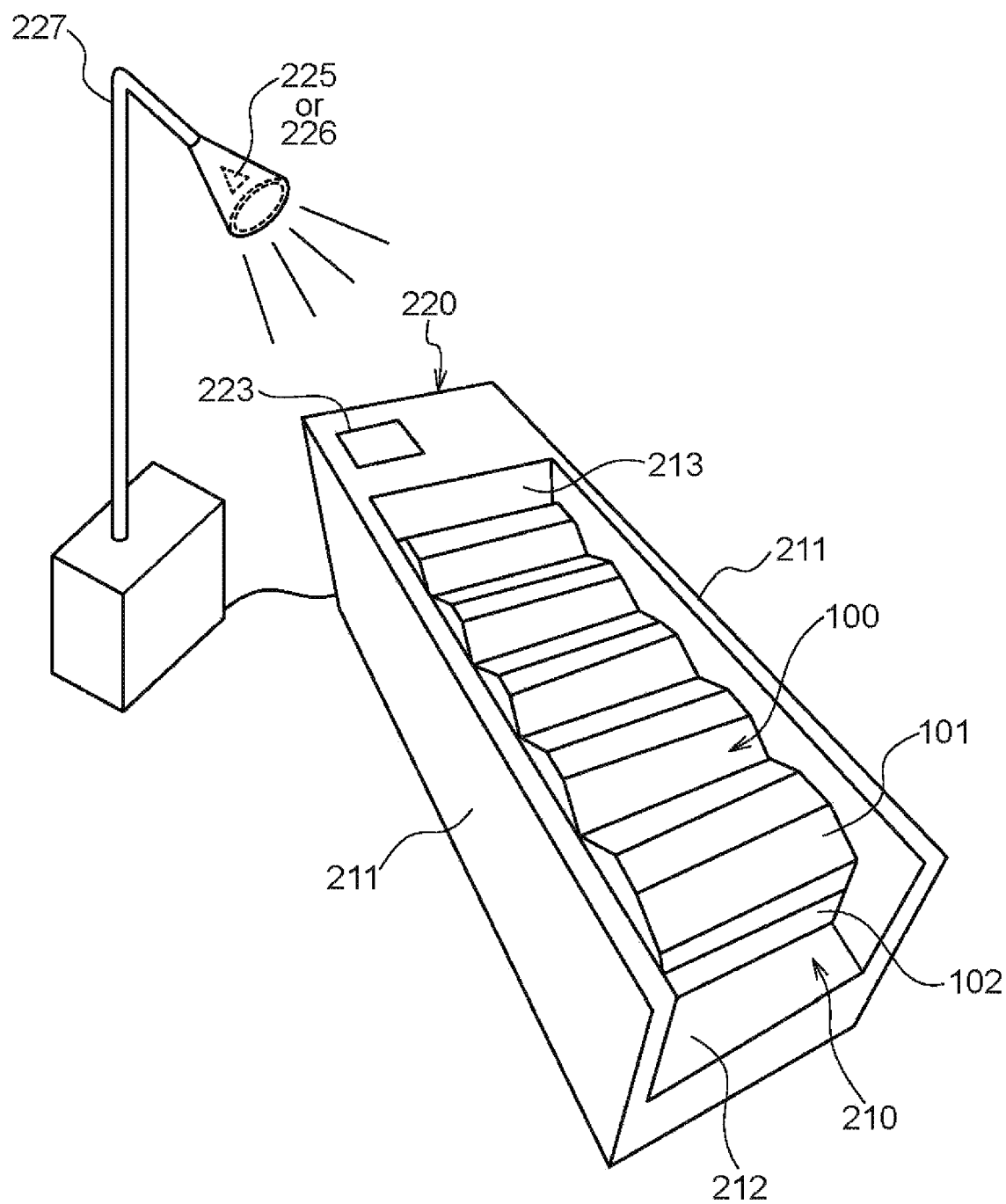
FIG. 27 is a diagram illustrating a configuration of an inspection system according to a modified example of the embodiment of the present invention.
Figure 28:
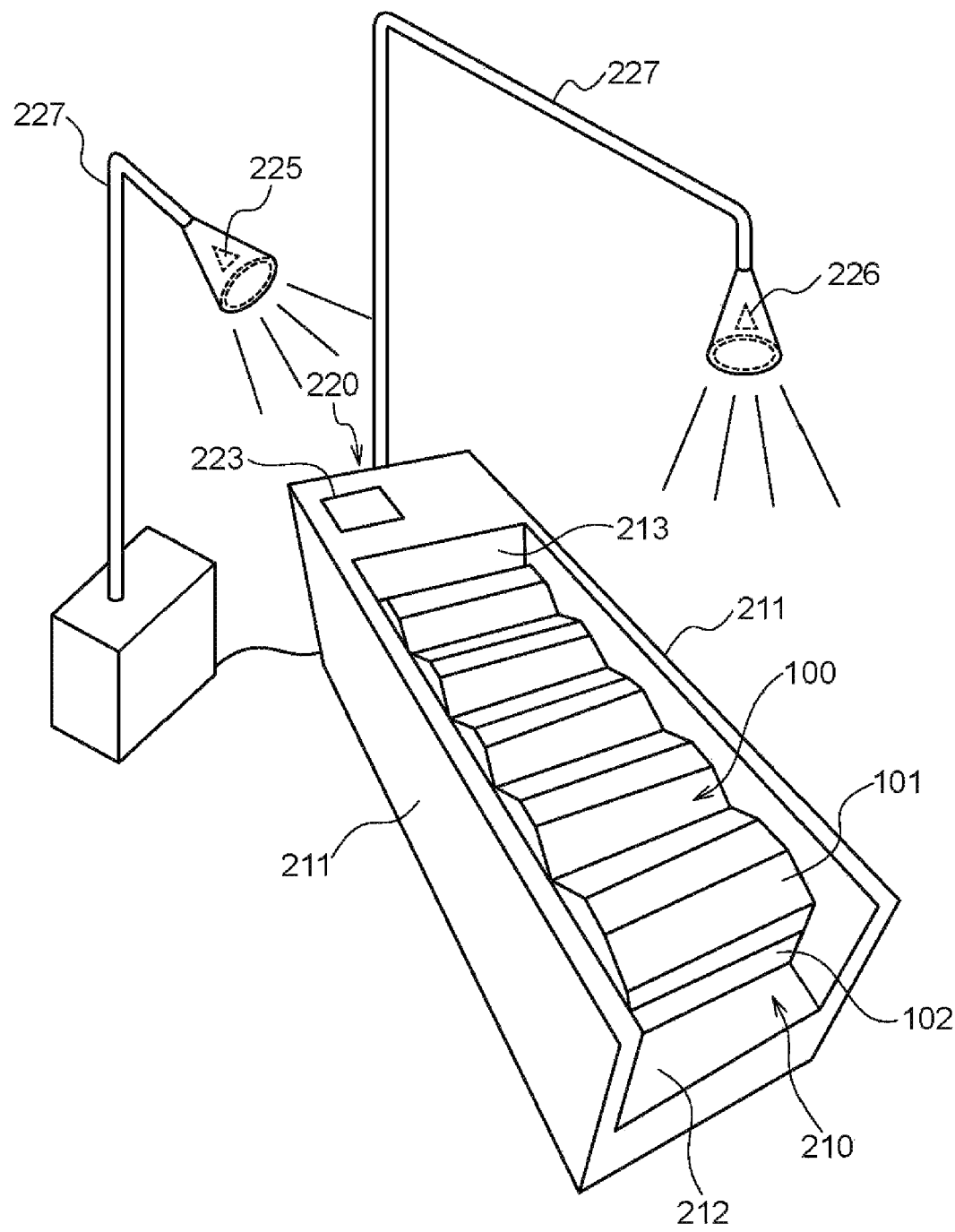
FIG. 28 is a diagram illustrating a configuration of an inspection system according to a modified example of the embodiment of the present invention.

Further, as illustrated in FIGS. 27 and 28, the infrared camera 225 and/or the visible light camera 226 and the arm 227 may be separated from the inspecting device 200, and the cameras may be connected to the computer 222. FIG. 27 illustrates an example in which only one of the infrared camera 225 and the visible light camera 226 is installed separately from the inspecting device 200, and FIG. 28 illustrates an example in which the infrared camera 225 is installed separately from the inspecting device 200, and the visible light camera 226 is installed integrally with the inspecting device 200. Further, in addition to the infrared camera 225 and the visible light camera 226, an ultraviolet camera may be installed as a third camera together with an ultraviolet lamp, or one of the cameras in FIGS. 27 and 28 may be an ultraviolet camera equipped with an ultraviolet lamp.

(Gaming Chip Information)

In the above embodiment, in the gaming chip C, the gaming chip information is stored in the RFID tag 503, the code information 505 serving as the gaming chip information is inscribed on the side surface, the designated color of the designated color layer 501 of the side surface is also dealt as the gaming chip information indicating the value of the gaming chip C, and one gaming chip C has the three pieces of gaming chip information, but the present invention is not limited to this example, and the gaming chip C may has only two of the three pieces of gaming chip information. When the gaming chip C has two pieces of gaming chip information, the first to fifth pass/fail determination methods can be executed.

In the above first to fifth pass/fail determination methods, two pieces of gaming chip information are used, but when the gaming chip C has three pieces of gaming chip information, the determining unit 231 performs the pass/fail determination using the three pieces of gaming chip information.

(Display Unit)

In the above embodiment, the example in which the display unit 223 is configured with a liquid crystal panel has been described, but the display unit 223 may be a lamp that simply indicates only whether it is pass or fail or may be a lamp that performs digital display of the total of the number of detections 801, the number of authorized gaming chips C 802, and the number of unauthorized gaming chips C 803.

(Total Amount Calculation of Value)

The determining unit 231 of the above embodiment is able to specify the number of each of the values of a plurality of gaming chips C contained in the case 100 as described above. In this regard, the determining unit 231 may further calculate a total amount of the values of a plurality of gaming chips C contained in the case 100 on the basis of the number of each value. The calculated total amount may be displayed on the pass/fail result display screen (see FIGS. 18 and 19) displayed on the display unit 223.

What is claimed is:

1. An inspection system comprising:
    an area in which can be placed in a stacked manner a plurality of gaming chips that include (a) first gaming chip information and (b) second gaming chip information; and
    an inspecting device that includes:
        a first reader, wherein the first reader is configured to acquire the first gaming chip information of all of the gaming chips placed in the area;
        a second reader, wherein the second reader is configured to optically read the side surfaces of the gaming chips placed in the area; and
        a processor, wherein the processor is configured to use the first gaming chip information acquired by the first reader and the second gaming chip information acquired by the second reader to determine an authenticity or damage status of all of the gaming chips placed in the area by comparing (a) the first gaming chip information acquired by the first reader and (b) the second gaming chip information acquired by the second reader.

2. The inspection system according to claim 1, wherein, to determine the authenticity or damage status, the processor is further configured to, determine whether the gaming chips are damaged.

3. The inspection system according to claim 1, wherein, to determine whether the authenticity or damage status, the processor is further configured to, (a) based on the acquired first gaming chip information and the acquired second gaming chip information, determine for each of a plurality of chip values, a respective number of the gaming chips contained in the area that are assigned the respective chip value.

4. The inspection system according to claim 1 wherein the first gaming chip information and the second gaming chip information of respective ones of the gaming chips include common information portions for inclusion of respective common information of the respective gaming chips, and the processor is configured to determine that a plurality of the gaming chips contained in the area are in a fail state when the common information portions of a plurality of pieces of the first gaming chip information acquired by the first reader do not coincide with corresponding common information portions of a plurality of pieces of the second gaming chip information acquired by the second reader.

5. The inspection system according to claim 1, wherein the first gaming chip information includes individual identification information individually identifying respective ones of the gaming chips.

6. The inspection system according to claim 5, wherein a plurality of the gaming chips contained in the area are determined to be in a fail state when the individual identification information of a plurality of pieces of first gaming chip information acquired by the first reader does not coincide with the individual identification information of a plurality of pieces of second gaming chip information acquired by the second reader.

7. The inspection system according to claim 1, further comprising:
    a storage unit, wherein the storage unit is configured to store first gaming chip information and the processor is configured to determine the damage status or a fake status when the first gaming chip information acquired by the first reader does not coincide with the first gaming chip information stored in the storage unit.

8. The inspection system according to claim 1, wherein the second gaming chip information includes information indicated by designated colors that indicate respective values of the gaming chips.

9. The inspection system according to claim 1, further comprising:
    a storage unit, wherein the storage unit is configured to store a correspondence relation between the first gaming chip information and the second gaming chip information, and wherein the processor is configured to determine that the plurality of gaming chips contained in the area are in a fail state when a plurality of pieces of the first gaming chip information acquired by the first reader and a plurality of pieces of the second gaming chip information acquired by the second reader do not coincide with the correspondence relation stored in the storage unit.

10. The inspection system according to claim 1, wherein to determine that a plurality of the gaming chips contained in the area are in a fail state, the processor is configured to compare a number of pieces determined based on the first gaming chip information acquired by the first reader and a number of pieces determined based on the second gaming chip information acquired by the second reader.

11. The inspection system according to claim 1, wherein:
    the gaming chips include color information indicating respective values of the gaming chips as the second gaming chip information, and include respective value information identifying respective values of the gaming chips as the first gaming chip information; and
    the processor is configured to determine that a plurality of the gaming chips contained in the area are in a fail state when the color information does not coincide with the value information of the first gaming chip information.

12. The inspection system according to claim 11, wherein:
    the second gaming chip information further includes respective value information of the respective gaming chips in addition to the color information; and
    the processor is configured to determine that a plurality of the gaming chips contained in the area are in the fail state when a value of a respective one of the gaming chips indicated by the color information in the second gaming chip information of the respective gaming chip does not coincide with the value information of the second gaming chip information and/or the value information of the first gaming chip information.

13. The inspection system according to claim 12, wherein the processor is configured to determine a respective number of the gaming chips contained in the area for each of the values or a total amount of the values of all of the gaming chips based on the color information or the value information of the first gaming chip information or the second gaming chip information.

14. The inspection system according to claim 11, wherein:
the second gaming chip information further includes respective value information of the respective gaming chips in addition to the color information; and
the processor is configured to determine that a plurality of the gaming chips contained in the area are in the fail state when the color information does not coincide with at least one of (a) the value information of the first or second gaming chip information, (b) common information of the first gaming chip information and the second gaming chip information, or (c) individual identification information included in the first or second gaming chip information.

15. The inspection system according to claim 1, wherein the first gaming chip information is included in respective radio tags of the gaming chips.

16. The inspection system according to claim 1, wherein the first gaming chip information and/or the second gaming chip information include group information indicating respective groups to which respective ones of the gaming chips belong, and the groups are classified in accordance with respective values of the gaming chips, manufacturing times, manufacturers, and/or use game halls.

17. The inspection system according to claim 1, wherein:
the second gaming chip information includes respective designated colors indicating respective values of the gaming chips on respective side surfaces of the gaming chips; and
the second reader comprises:
a camera that is configured to photograph the side surfaces of the gaming chips contained in the area to capture an image; and
a second processor that is configured to:
analyze an image captured by the camera;
identify and output the respective designated colors of each of the plurality of gaming chips based on the analysis; and
identify and output the respective values of the plurality of gaming chips in accordance with the identified designated colors.

18. The inspection system according to claim 17, wherein the designated colors are respectively interposed, in a thickness direction of the side surfaces of the gaming chips, between common colors which are commonly assigned to gaming chips having different values.

19. The inspection system according to claim 1, wherein:
the second gaming chip information is notation information inscribed on the side surfaces to be optically readable; and
the second reader comprises:
a camera that is configured to photograph the side surfaces of the gaming chips stacked and contained in the area to capture an image; and
a second processor configured to:
analyze the image captured by the camera;
based on the analysis, identify the respective notation information of each of the gaming chips; and
identify and output the second gaming chip information of each of the gaming chips in accordance with the identified respective notation information.

20. The inspection system according to claim 19, wherein:
the notation information is inscribed using infrared reaction ink that emits in response to infrared rays or using infrared absorption ink that absorbs infrared rays; and
the camera comprises an infrared camera.

21. The inspection system according to claim 19, wherein:
the notation information is inscribed using ink that emits light in response to ultraviolet rays; and
the inspecting device further includes an ultraviolet irradiator that is configured to irradiate the side surfaces of the gaming chips contained in the area with ultraviolet rays.

22. The inspection system according to claim 1, wherein:
the area is a case that has a seal which is broken when the case is opened to allow the gaming chips to be withdrawn from the case;
the inspecting device further comprises a sensor that is configured to detect whether the seal is unbroken; and
the processor is configured to determine that the gaming chips contained in the case are in a fail state when the unbroken seal is not detected by the sensor.

* * * * *